United States Patent
Chang et al.

(10) Patent No.: US 9,467,967 B2
(45) Date of Patent: Oct. 11, 2016

(54) USER TERMINAL, PROCESSOR, AND METHOD

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/418,572

(22) PCT Filed: Aug. 2, 2013

(86) PCT No.: PCT/JP2013/071053
§ 371 (c)(1),
(2) Date: Jan. 30, 2015

(87) PCT Pub. No.: WO2014/021463
PCT Pub. Date: Feb. 6, 2014

(65) Prior Publication Data
US 2015/0223193 A1    Aug. 6, 2015

Related U.S. Application Data

(60) Provisional application No. 61/679,359, filed on Aug. 3, 2012.

(51) Int. Cl.
*H04W 24/00* (2009.01)
*H04W 64/00* (2009.01)
*H04W 16/18* (2009.01)
*H04W 24/10* (2009.01)
(Continued)

(52) U.S. Cl.
CPC ............ *H04W 64/006* (2013.01); *G01S 19/24* (2013.01); *H04M 1/72572* (2013.01); *H04W 16/18* (2013.01); *H04W 24/10* (2013.01)

(58) Field of Classification Search
CPC . H04W 64/006; H04W 16/18; H04W 24/10; H04M 1/72572; G01S 19/24
USPC ......... 455/456.1, 456.2, 456.3, 456.4, 456.5, 455/456.6, 457
See application file for complete search history.

(56) References Cited

U.S. PATENT DOCUMENTS

2012/0039365 A1* 2/2012 Suzuki .................... G01S 19/05
375/147
2012/0113837 A1* 5/2012 Siomina ................ H04W 24/10
370/252

(Continued)

FOREIGN PATENT DOCUMENTS

EP    2 809 098 A1    12/2014

OTHER PUBLICATIONS

International Search Report; PCT/JP2013/071053; Sep. 24, 2013.
(Continued)

*Primary Examiner* — Shahriar Behnamian
(74) *Attorney, Agent, or Firm* — Studebaker & Brackett PC

(57) ABSTRACT

A user terminal according to a first feature supports an Immediate MDT. The user terminal includes: a GNSS receiver for obtaining GNSS location information; a user interface that receives an operation from a user; and a controller that keeps the GNSS receiver an active state for the Immediate MDT unless the user turns the GNSS receiver off, in a case where the user terminal is requested by a network to make the GNSS location information available.

6 Claims, 23 Drawing Sheets

(51) Int. Cl.
*G01S 19/24* (2010.01)
*H04M 1/725* (2006.01)

(56) References Cited

U.S. PATENT DOCUMENTS

| | | | | |
|---|---|---|---|---|
| 2013/0005381 A1* | 1/2013 | Turkka | G01S 11/06 | 455/517 |
| 2013/0045735 A1* | 2/2013 | Kim | H04W 36/0094 | 455/422.1 |
| 2013/0203420 A1* | 8/2013 | Hapsari | H04W 24/10 | 455/437 |
| 2013/0281063 A1* | 10/2013 | Jactat | H04W 24/00 | 455/411 |
| 2014/0051428 A1* | 2/2014 | Jung | H04W 24/10 | 455/422.1 |

OTHER PUBLICATIONS

3GPP TS 37.320 V10.4.0 (Dec. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

LG Electronics Inc.; "On-demand positioning"; 3GPP TSG-RAN WG2 #77bis R2-121605; Jeju, Korea; Mar. 26-30, 2012.

Kyocera; "Further considerations for Requested Location Information"; 3GPP TSG-RAN WG2 #78 R2-122787; Prague, Czech Republic; May 21-25, 2012.

Kyocera; "Enhanced Availability of Detailed Location Information"; 3GPP TSG-RAN WG2 #77bis R2-121288; Jeju, Korea; Mar. 26-30, 2012.

The extended European search report issued by the European Patent Office on Feb. 26, 2016, which corresponds to European Patent Application No. 13826013.8-1854 and is related to U.S. Appl. No. 14/418,572.

LG Electronics Inc.; "On-demand positioning"; 3GPP TSG-RAN WG2 #77bis R2-121785; Jeju, Korea; Mar. 26-30, 2012.

* cited by examiner

USER TERMINAL, PROCESSOR, AND METHOD

TECHNICAL FIELD

The present invention relates to a user terminal supporting MDT technology, and a mobile communication system including the user terminal.

BACKGROUND ART

In a mobile communication system, a radio communication environment around a base station varies if a building is built near the base station or installation conditions of neighboring base stations of the base station are changed. Thus, it is a conventional practice to carry out a drive test in which an operator uses a measurement vehicle having measurement equipment on board to measure a radio environment and collect measurement data.

Such measurement and collection is helpful in network optimization (such as coverage optimization); however, it has a problem of requiring a large number of man-hours and high cost. To deal with this problem, the 3GPP (3rd Generation Partnership Project) as a standardization project for mobile communication systems is formulating a specification of MDT (Minimization of Drive Tests) for automating the measurement and collection by using a user terminal in Release 10 or later (refer to Non-patent Document 1, for example).

One mode of MDT is log-type MDT (referred to as "Logged MDT"). According to the current specification, Logged MDT is such a mode that a user terminal in IDLE mode measures a radio environment in accordance with measurement configuration information set by a network, logs as measurement data the measurement result together with location information and time information, and reports the measurement data to the network later.

Another mode of MDT is immediate-report-type MDT (referred to as "Immediate MDT"). According to the current specification, Immediate MDT is such a mode that a user terminal in CONNECTED mode measures a radio environment in accordance with measurement configuration information set by a network and immediately reports as measurement data the measurement result together with location information to the network.

PRIOR ART DOCUMENT

Non-Patent Document

[Non-patent Document 1] 3GPP Technical Specification TS 37.320 V10.4.0 (2011-12)

SUMMARY OF THE INVENTION

The current MDT technology has the following problem. Specifically, location information acquired by a user terminal is not guaranteed in accuracy and therefore measurement data that the user terminal reports to a network has low reliability.

In view of this, an objective of the present invention is to improve the MDT technology.

A user terminal according to a first feature supports an Immediate MDT. The user terminal includes: a GNSS receiver for obtaining GNSS location information; a user interface that receives an operation from a user; and a controller that keeps the GNSS receiver an active state for the Immediate MDT unless the user turns the GNSS receiver off, in a case where the user terminal is requested by a network to make the GNSS location information available.

A processor according to a second feature is provided in a user terminal that supports an Immediate MDT and includes: a GNSS receiver for obtaining GNSS location information; and a user interface that receives an operation from a user. The processor is configured to keep the GNSS receiver an active state for the Immediate MDT unless the user turns the GNSS receiver off, in a case where the user terminal is requested by a network to make the GNSS location information available.

A method according to a third feature is for a user terminal that supports an Immediate MDT and includes: a GNSS receiver for obtaining GNSS location information; and a user interface that receives an operation from a user. The method includes: keeping the GNSS receiver an active state for the Immediate MDT unless the user turns the GNSS receiver off, in a case where the user terminal is requested by a network to make the GNSS location information available.

DESCRIPTION OF EMBODIMENTS

Summary of Embodiments

Figure 1:
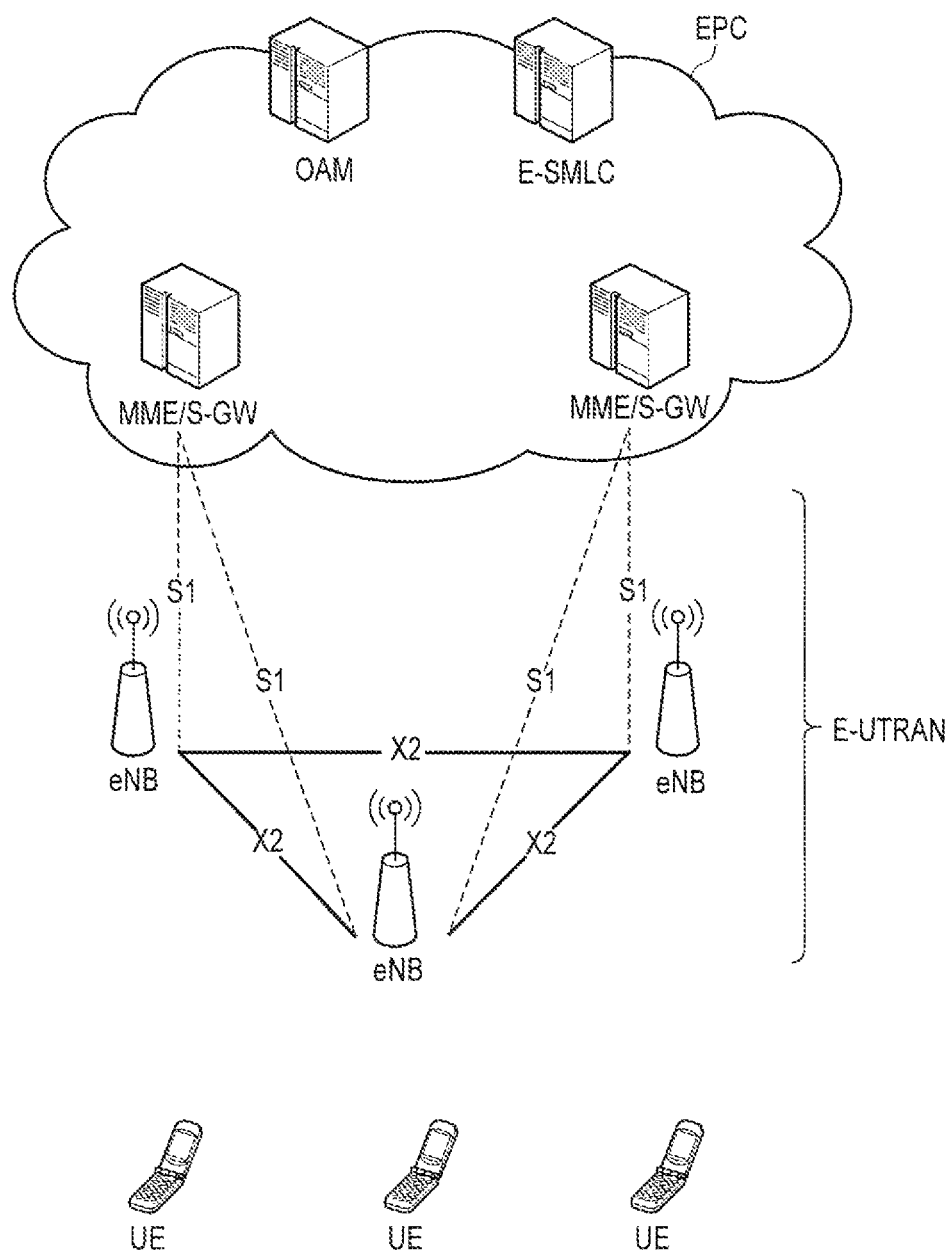
FIG. 1 shows a configuration of a mobile communication system according to an embodiment.

A user terminal according to embodiments supports an Immediate MDT. The user terminal includes: a GNSS receiver for obtaining GNSS location information; a user interface that receives an operation from a user; and a controller that keeps the GNSS receiver an active state for the Immediate MDT unless the user turns the GNSS receiver off, in a case where the user terminal is requested by a network to make the GNSS location information available.

In the embodiments, while the GNSS receiver is an active state, the controller continues to perform GNSS measurements based on capabilities of the GNSS receiver even when the GNSS location information isn't needed except for the Immediate MDT, in a case where the user terminal is requested by the network to make the GNSS location information available.

A processor according to embodiments is provided in a user terminal that supports an Immediate MDT and includes: a GNSS receiver for obtaining GNSS location information; and a user interface that receives an operation from a user. The processor is configured to keep the GNSS receiver an active state for the Immediate MDT unless the user turns the GNSS receiver off, in a case where the user terminal is requested by a network to make the GNSS location information available.

In the embodiments, while the GNSS receiver is an active state, the processor continues to perform GNSS measurements based on capabilities of the GNSS receiver even when the GNSS location information isn't needed except for the Immediate MDT, in a case where the user terminal is requested by the network to make the GNSS location information available.

A method according to embodiments is for a user terminal that supports an Immediate MDT and includes: a GNSS receiver for obtaining GNSS location information; and a user interface that receives an operation from a user. The method includes: keeping the GNSS receiver an active state for the Immediate MDT unless the user turns the GNSS receiver off, in a case where the user terminal is requested by a network to make the GNSS location information available.

In the embodiments, while the GNSS receiver is an active state, continuing to perform GNSS measurements based on capabilities of the GNSS receiver even when the GNSS location information isn't needed except for the Immediate MDT, in a case where the user terminal is requested by the network to make the GNSS location information available.

A mobile communication system according to embodiments includes: a base station; and a user terminal that transmits a measurement report including a measurement result of radio environments, to the base station. The base station transmits request information requesting the user terminal to make detailed location information available using GNSS (Global Navigation Satellite System), to the user terminal. The user terminal attempts to make the detailed location information available so as to include the detailed location information in the measurement report, in a case where the user terminal receives the request information from the base station.

In the embodiments, the user terminal turns a GNSS receiver to an on state in response to a reception of the request information, in a case where the GNSS receiver is an off state when the user terminal receives the request information from the base station.

In the embodiments, the user terminal transmits the measurement report not including the detailed location information when the user terminal does not have available detailed location information, even in a case where user terminal receives the request information from the base station.

In the embodiments, the base station applies the request information to Immediate MDT, without applying the request information to Logged MDT.

In the embodiments, the base station transmits the request information along with configuration information indicating that the user terminal should include location information in the measurement report. The user terminal receives the request information along with the configuration information.

In the embodiments, the request information is an information element specified in a predetermined release number of a communication standard (3GPP standard release 11). The configuration information is an information element specified in not only the predetermined release number but also other release number older than the predetermined release number (3GPP standard release 10).

A base station according to embodiments includes: a receiver that receives a measurement report including a measurement result of radio environments, from a user terminal; and a transmitter that transmits request information requesting the user terminal to attempt to make detailed location information available such that the measurement report includes the detailed location information using GNSS (Global Navigation Satellite System), to the user terminal.

A user terminal according to embodiments includes: a transmitter that transmits a measurement report including a measurement result of radio environments, to a base station; a receiver that receives request information requesting the user terminal to make detailed location information available using GNSS (Global Navigation Satellite System), from the base station; and a controller that attempts to make the detailed location information available so as to include the detailed location information in the measurement report, in a case where the receiver receives the request information.

A processor according to embodiments is provided in a base station. The processor executes: a process for receiving a measurement report including a measurement result of radio environments, from a user terminal; and a process for transmitting request information requesting the user terminal to attempt to make detailed location information available such that the measurement report includes the detailed location information using GNSS (Global Navigation Satellite System), to the user terminal.

A processor according to embodiments is provided in a user terminal. The processor executes: a process for transmitting a measurement report including a measurement result of radio environments, to a base station; a process for receiving request information requesting the user terminal to make detailed location information available using GNSS (Global Navigation Satellite System), from the base station; and a process for attempting to make the detailed location information available so as to include the detailed location information in the measurement report, in a case where the receiver receives the request information.

Moreover, in a mobile communication system including a user terminal that supports MDT technology, the user terminal includes a positioning unit that acquires detailed location information indicating a detailed location of the user terminal. If the user terminal is instructed by a network to carry out MDT measurement processing for acquiring the detailed location information together with a radio environment measurement result, the user terminal performs control to turn the positioning unit to an on state at timing when the user terminal receives the instruction or transitions to an idle mode. This enables the user terminal to carry out the MDT measurement processing in a state of being capable of acquiring detailed location information which is accurate location information.

At a predetermined trigger, the user terminal sends the network the radio environment measurement result and information indicating whether or not the detailed location information is acquired. This enables the network to judge whether or not measurement data acquired from the user terminal includes detailed location information (that is, whether or not the measurement data is highly reliable).

The mobile communication system may further include a network device that instructs the user terminal including the positioning unit to carry out the MDT measurement processing and to turn the positioning unit to the on state. This makes it possible to make the user terminal carry out the MDT measurement processing while letting the user terminal capable of acquiring detailed location information.

Here, the network device indicates a base station or an upper network node than the base station, for example.

First Embodiment

In this embodiment, a description is given of an embodiment in the case where the present invention is applied to a mobile communication system configured based on the 3GPP standard of Release 10 or later; however, this embodiment focuses on achieving MDT which enables acquisition of detailed location information in the 3GPP standard of Release 11 or later.

Hereinbelow, an outline of a mobile communication system, an outline of MDT, internal configurations, and operation sequences are described in this order.

(Outline of Mobile Communication System)

FIG. 1 shows a configuration of the mobile communication system according to this embodiment.

As shown in FIG. 1, the mobile communication system according to this embodiment includes: an E-UTRAN (Evolved-UMTS Terrestrial Radio Access Network); multiple UEs (User Equipment); and an EPC (Evolved Packet Core). In this embodiment, the E-UTRAN and EPC constitute a network.

The E-UTRAN includes multiple eNBs (evolved Node-B). Each eNB is equivalent to a base station. The eNB manages a cell and performs radio communications with a UE having established a connection with the cell. Here, a "cell" is used not only as a term indicating the minimum unit of a radio communication area but also as a function to perform radio communications with a UE. In addition, an eNB includes functions such as a radio resource management (RRM) function, a user data routing function, and a measurement control function for mobility control and scheduling.

The EPC includes: MMEs (Mobility Management Entity); S-GWs (Serving-Gateway); an OAM (Operation and Maintenance); and an E-SMLC (Evolved Serving Mobile Location Centre).

Each MME is a network node that performs various kinds of mobility control over UEs, for example, and is equivalent to a control station. Each S-GW is a network node that performs user data transfer control, and is equivalent to a relay station.

The eNBs are connected to one another via X2 interfaces, and are connected to the MMEs and S-GWs via S1 interfaces.

The OAM is a server device that is managed by an operator, and maintains and monitors the E-UTRAN. The OAM is also capable of controlling UEs.

The E-SMLC is a server device for generating and managing location information. The E-SMLC establishes a session (for example, a GNSS (Global Navigation Satellite System) session) with a UE in CONNECTED mode, and operates in conjunction with the UE in order for the UE to generate location information. See 3GPP TS 36.305 for details of the E-SMLC.

Each UE is a mobile radio communication device, and performs radio communications with a cell with which it has established a connection (such a cell is referred to as a serving cell). In this embodiment, the UE is equivalent to a user terminal.

The UE in IDLE mode which is equivalent to a standby mode selects a cell on which to camp, and waits for an instruction from the eNB in the selected cell. Processing of changing the cell on which to camp in IDLE mode is referred to as cell reselection. Meanwhile, the UE in CONNECTED mode which is equivalent to a communicating mode performs radio communications with the serving cell. Processing of changing the serving cell in CONNECTED mode is referred to as handover.

Figure 2:
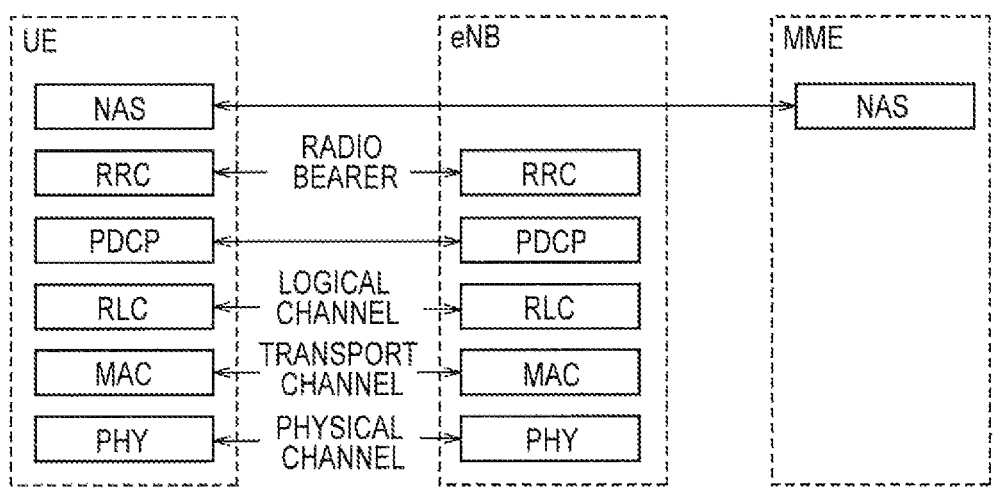
FIG. 2 shows a protocol stack of a radio interface in the mobile communication system according to the embodiment.

FIG. 2 shows a protocol stack of a radio interface in the mobile communication system.

As shown in FIG. 2, radio interface protocols are classified into layer 1 to layer 3 of the OSI reference model, where: layer 1 is the physical (PHY) layer; layer 2 includes the MAC (Media Access Control) layer, the RLC (Radio Link Control) layer, and the PDCP (Packet Data Convergence Protocol) layer; and layer 3 includes the RRC (Radio Resource Control) layer.

The physical layer performs data coding/decoding, modulation/demodulation, antenna mapping/demapping, and resource mapping/demapping. The physical layer provides a transmission service to the upper layer through a physical channel. Data is transmitted through a physical channel between the physical layer of the UE and the physical layer of the eNB. The physical layer is connected to the MAC layer via a transport channel.

The MAC layer performs priority control of data, retransmission processing by hybrid ARQ (HARQ), and the like. Data is transmitted through a transport channel between the MAC layer of the UE and the MAC layer of the eNB. The MAC layer of the eNB includes a MAC scheduler that determines a transport format and resource blocks to be used in the uplink and the downlink. A transport format includes a transport block size, a modulation and coding scheme (MCS), and antenna mapping.

The RLC layer uses the functions of the MAC layer and the physical layer to transmit data to the RLC layer on the reception side. Data is transmitted through a logical channel between the RLC layer of the UE and the RLC layer of the eNB.

The PDCP layer performs header compression/expansion and encryption/decoding.

The RRC layer is defined only in the control plane. Data is transmitted through a radio bearer between the RRC layer of the UE and the RRC layer of the eNB. The RRC layer controls a logical channel, a transport channel, and a physical channel upon establishment, reestablishment and release of the radio bearer. When an RRC connection is established between the RRC of the UE and the RRC of the eNB, the UE is in CONNECTED mode, and if not, the UE is in IDLE mode.

The NAS (Non-Access Stratum) layer which is an upper layer of the RRC layer performs session management, mobility management, and the like.

Figure 3:
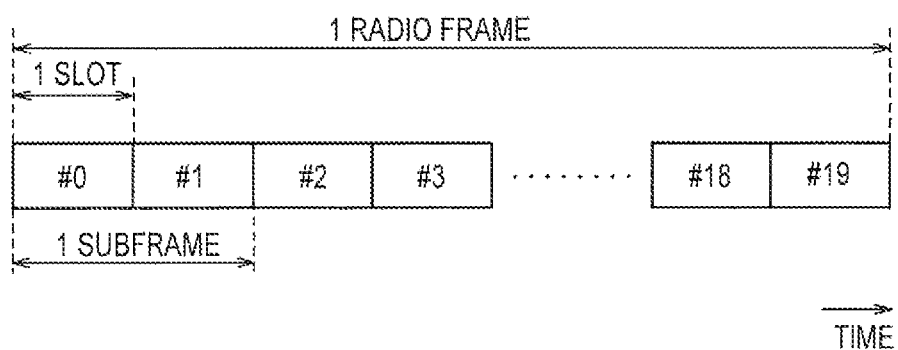
FIG. 3 shows a configuration of a radio frame used in the mobile communication system according to the embodiment.

FIG. 3 shows a configuration of a radio frame used in the mobile communication system according to this embodiment. The mobile communication system employs OFDMA (Orthogonal Frequency Division Multiplexing Access) in the downlink, and SC-FDMA (Single Carrier Frequency Division Multiple Access) in the uplink.

As shown in FIG. 3, a radio frame is formed of ten subframes aligned in the time direction, and each subframe is formed of two slots arranged side by side in the time direction. Each subframe is 1 ms in length, and each slot is 0.5 ms in length. Each subframe includes multiple resource blocks (RB) in the frequency direction, and includes multiple symbols in the time direction. A guard interval called a cyclic prefix (CP) is provided at the beginning of each symbol.

In the downlink, an interval of the couple of symbols at the beginning of each subframe is mainly a control region used as a physical downlink control channel (PDCCH). The remaining interval of the subframe is a data region mainly used as a physical downlink shared channel (PDSCH).

In the uplink, the two ends of each subframe in the frequency direction are control regions mainly used as a physical uplink control channel (PUCCH). A center portion of the subframe in the frequency direction is a data region mainly used as a physical uplink shared channel (PUSCH).

(Outline of MDT)

The mobile communication system according to this embodiment supports MDT technology. A description is given here of an outline of the MDT technology, details of which are described in Non-patent Document 1.

First of all, an outline of Logged MDT is described.

According to Logged MDT, the UE in IDLE mode measures a radio environment (such as Reference Signal Received Power (RSRP) and Reference Signal Received Quality (RSRQ)) in accordance with a measurement configuration (Logged Measurement Configuration) set by a network, and logs the measurement result as measurement data in association with location information and time information.

The measurement configuration (Logged Measurement Configuration) includes various parameters such as a measurement trigger, a measurement period, and a network absolute time stamp. The measurement trigger is a parameter for specifying a trigger (event) for measurement. The measurement period is a parameter for specifying a period from the time when the measurement configuration is set until the MDT measurement processing ends. The network absolute time stamp is a parameter used as a reference of time information.

Upon receiving the measurement configuration (Logged Measurement Configuration), the UE in CONNECTED mode sets a Duration timer inside the UE to a measurement period included in the measurement configuration, and initiates the Duration timer. Upon detecting the trigger specified by the measurement trigger, the UE in IDLE mode measures a radio environment and logs measurement data including the measurement result, location information, and time information. Here, the location information included in the measurement data (log) is the latest among those acquired within the validity time. Further, the time information is generated based on the network absolute time stamp which is one of the measurement parameters.

If having the measurement data, the UE monitors and checks whether or not any of triggers for transmission in Availability Indicator occurs. The triggers for transmission in Availability Indicator include: transition from IDLE mode to CONNECTED mode (RRC connection establishment); execution of handover (RRC connection re-establishment); and settings newly made at an upper layer (RRC re-configuration).

Upon receiving a request to transmit the measurement data from the network by means of Availability Indicator, the UE transmits (reports) the measurement data held by itself to the network. If finding a problem based on the measurement data thus acquired, the OAM can notify the operator of the problem thus found, or optimize the network to solve this problem.

Next, an outline of Immediate MDT is described.

According to Immediate MDT, the UE in CONNECTED mode measures a radio environment in accordance with the measurement configuration set by the network, and immediately reports as measurement data the measurement result together with location information to the network. Note that Immediate MDT is achieved by expansion of Measurement report procedures. Upon receiving the measurement data from the UE, the eNB adds time information to the measurement data and transfers the resultant data to the OAM. If finding a problem based on the measurement data thus acquired, the OAM can notify the operator of the problem thus found, or optimize the network to solve this problem.

(Internal Configuration)

Next, internal configurations of the OAM, the eNB, and the UE are described.

Figure 4:
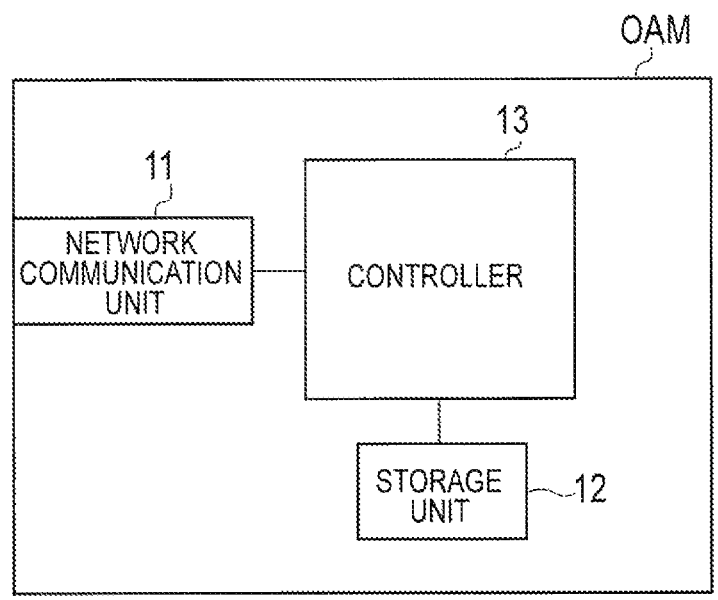
FIG. 4 is a block diagram of an OAM according to the embodiment.

FIG. 4 is a block diagram of the OAM. As shown in FIG. 4, the OAM includes: a network communication unit 11; a storage unit 12; and a controller 13. The network communication unit 11 communicates with the E-SMLC, each eNB, and each UE. The storage unit 12 stores information used for control made by the controller 13. The controller 13 performs various kinds of control to be described below.

Figure 5:
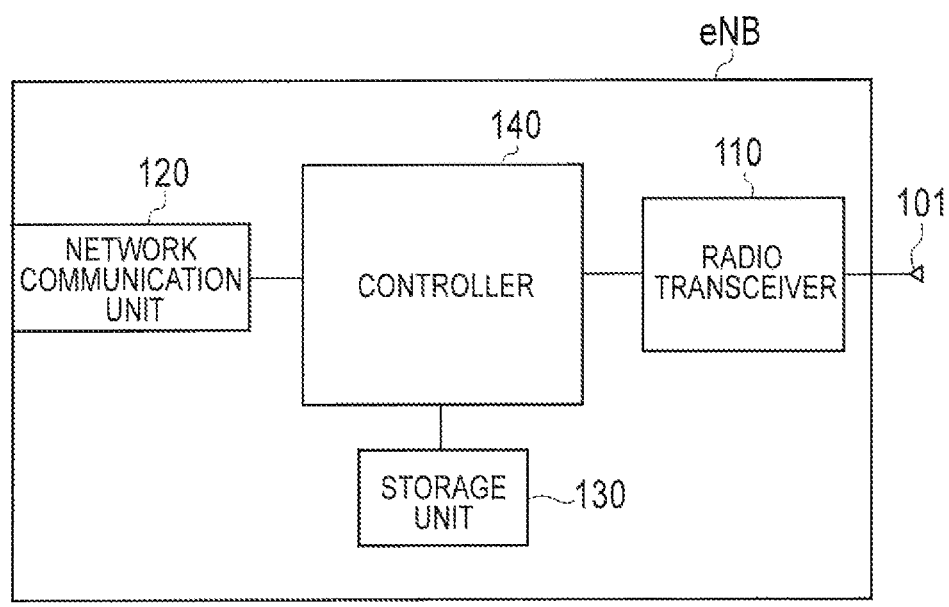
FIG. 5 is a block diagram of an eNB according to the embodiment.

FIG. 5 is a block diagram of the eNB. As shown in FIG. 5, the eNB includes: an antenna 101; a radio transceiver 110; a network communication unit 120; a storage unit 130; and a controller (processor) 140. The antenna 101 and the radio transceiver 110 are used for exchanging radio signals. The network communication unit 120 performs communications via the network interfaces (the X2 interfaces and the S1 interfaces). The storage unit 130 stores information used for control made by the controller 140. The controller 140 performs the processes of the layers described above and performs various kinds of control to be described below.

Figure 6:
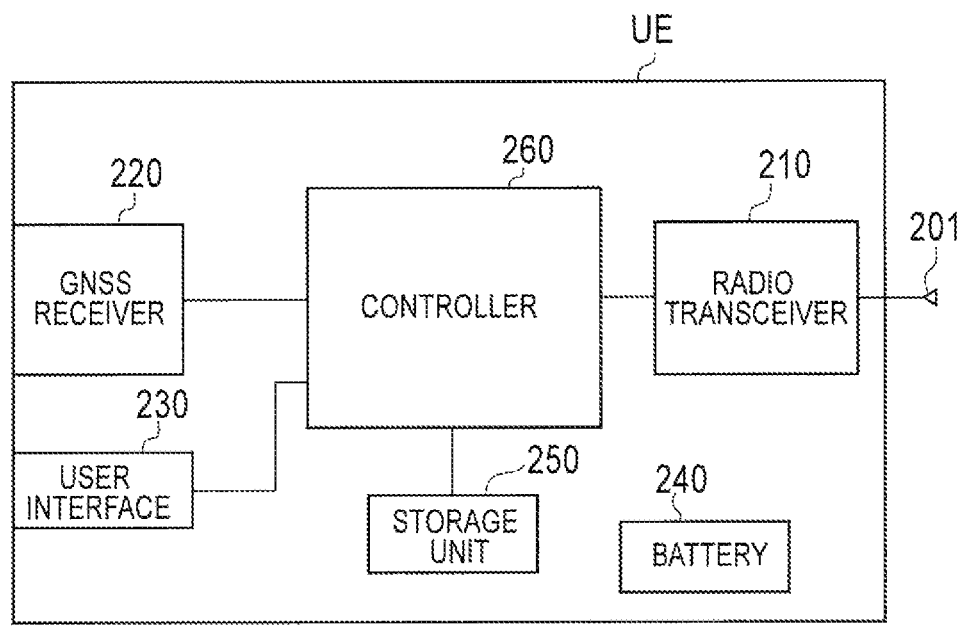
FIG. 6 is a block diagram of a UE according to the embodiment.

FIG. 6 is a block diagram of the UE. It should be noted that, although the configuration of the UE described here has a GNSS receiver, there is also a UE having no GNSS receiver.

As shown in FIG. 6, the UE includes: an antenna 201; a radio transceiver 210; a GNSS receiver 220; a user interface 230; a battery 240; a storage unit 250; and a controller (processor) 260.

The antenna 201 and the radio transceiver 210 are used for exchanging radio signals. The GNSS receiver 220 receives a GNSS signal in order to acquire detailed location information indicating a detailed location of the UE, and outputs the received signal to the controller 260.

The user interface 230 is an interface to the user of the UE, and includes a display, a microphone, a speaker, and various buttons, for example. In response to the user's manipulation, the user interface 230 outputs signals, indicating the manipulation contents, to the controller 260.

The battery 240 is a rechargeable battery which stores power to be supplied to blocks of the UE.

The storage unit 250 stores information used for control made by the controller 260. The controller 260 performs the processes of the layers described above, processes associated with MDT, as well as various kinds of control to be described below.

The controller 260 acquires detailed location information based on the signal outputted from the GNSS receiver 220. In this case, the controller 260 may establish a session with the E-SMLC in CONNECTED mode to correct the detailed location information based on the output from the GNSS receiver 220. Thereby, accurate detailed location information can be obtained. Such a method is called network assisted GNSS.

Alternatively, the controller 260 may carry out a positioning method other than that using the GNSS receiver 220 (including network assisted GNSS). For example, the controller 260 may carry out a positioning method (such as OTDOA) based on radio signals that the radio transceiver 210 receives from the multiple eNBs (multiple cells). In this case, the controller 260 in CONNECTED mode establishes a session with the E-SMLC. Then, the E-SMLC calculates the location of the UE based on information which is received from the UE and indicates time differences among synchronization signals that the UE has received from the multiple eNBs, and transmits the measurement result to the UE. Thereby, detailed location information can be obtained.

Still alternatively, the controller 260 may carry out a hybrid positioning method which is a method using, in combination, the positioning method using the GNSS receiver 220 (including network assisted GNSS) and the positioning method using radio signals received from the multiple eNBs (multiple cells).

(Operation Sequence)

Hereinbelow, operation sequences according to this embodiment are described.

The operation sequences according to this embodiment include an OAM-led operation (Signaling-based operation) and an eNB-led operation (Management-based operation).

The Signaling-based and Management-based operations each include an operation according to Logged MDT and an operation according to Immediate MDT.

Approaches to acquire detailed location information in each of Logged MDT and Immediate MDT include an approach of selecting a UE capable of acquiring detailed location information (Approach 1), an "on-demand" approach of requesting location information for MDT (Approach 2), and mixed patterns of Approaches 1 and 2.

(1) Signaling-Based Operation (1.1) Logged MDT

First of all, Signaling-based Logged MDT is described.

(1.1.1) Approach 1

Figure 7:
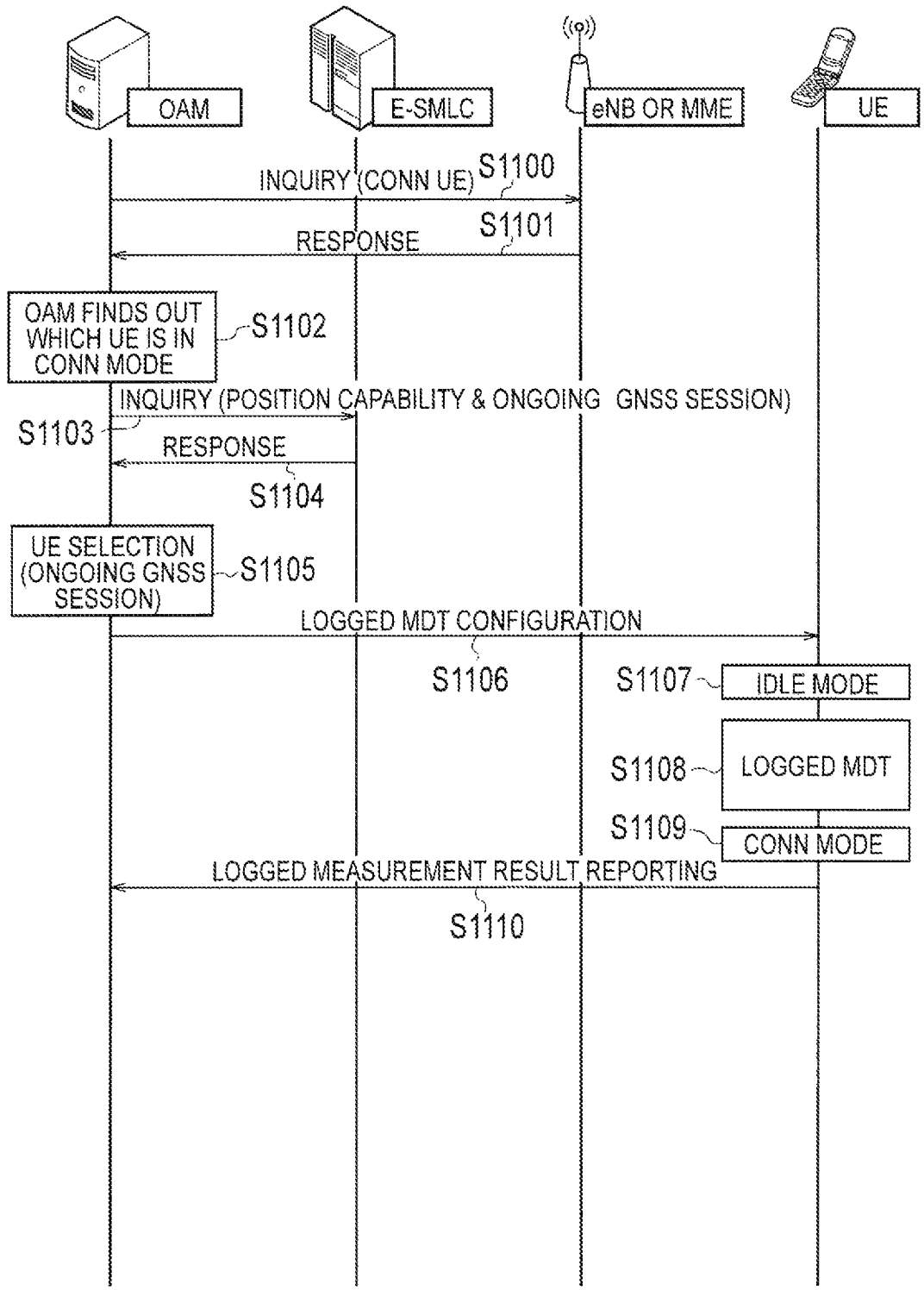
FIG. 7 is an operation sequence diagram in the case of employing Approach 1 in Signaling-based Logged MDT.

FIG. 7 is an operation sequence diagram in the case of employing Approach 1 in Signaling-based Logged MDT.

As shown in FIG. 7, in Step S1100, the OAM inquires of the network node (the eNB or the MME) which UEs are in CONNECTED mode.

In Step S1101, the network node (the eNB or the MME) having received the inquiry in Step S1100 notifies the OAM of UEs in CONNECTED mode in response to the inquiry.

In Step S1102, the OAM finds out which UEs are in CONNECTED mode through the notification received in Step S1100.

In Step S1103, the OAM inquires of the E-SMLC as to the positioning capability of each UE in CONNECTED mode and if an ongoing session exists between the UE and the E-SMLC. Note that, if a different network node knows the positioning capability of the UE and if an ongoing session exists between the UE and the E-SMLC, the OAM may inquire of the different network node.

In Step S1104, the E-SMLC notifies the OAM of the positioning capability of the UE in CONNECTED mode and the ongoing session between the UE and the E-SMLC, in response to the inquiry in Step S1103.

In Step S1105, the OAM selects a UE capable of acquiring detailed location information based on the notification received in Step S1100, in order to use it in MDT. More specifically, the OAM selects a UE equipped with the GNSS receiver 220 and having an ongoing session with the E-SMLC.

In Step S1106, the OAM sets Logged MDT in the UE via the eNB. More specifically, the OAM transmits Logged MDT setting information (Logged Measurement Configuration) to the UE via the eNB. In the Logged Measurement Configuration, the OAM (or the eNB) may include information (a 1-bit indicator, for example) on the reason why the UE has been selected (i.e., the reason that the UE is capable of acquiring detailed location information or the reason that the UE carries out MDT in Release 11 or later).

In Step S1107, the UE transitions from CONNECTED mode to IDLE mode.

In Step S1108, the UE carries out MDT measurement processing (Logged MDT measurement) in accordance with the Logged Measurement Configuration.

The UE performs any one of the following control (a1) to (c1) when the user performs manipulation to turn off the GNSS receiver 220. Note that, however, the UE cannot select the control (a1), (c1), and (d1) unless the reason why the UE has been selected is indicated in Step S1106.

(a1) If the user turns off the GNSS receiver 220 before the transition from CONNECTED mode to IDLE mode, or if the GNSS receiver 220 becomes OFF state because location information is not required except for use in MDT and thus the GNSS receiver 220 is no longer necessary to be kept in ON state (for example, when an application requiring location information is over), the UE turns on the GNSS receiver 220 automatically (i.e., without notification to the user) when transitioning to IDLE mode.

(b1) The UE turns off the GNSS receiver 220. Then, the UE carries out MDT measurement processing (Logged MDT measurement) without acquiring detailed location information.

(c1) The UE turns off the GNSS receiver 220. Then, the UE turns on the GNSS receiver 220 automatically (i.e., without notification to the user) unless it matches predetermined criteria (such as a condition of small remaining battery capacity).

(d1) The UE turns off the GNSS receiver 220 as well as stops the MDT measurement processing (Logged MDT measurement). This is because the MDT measurement processing (Logged MDT measurement) is useless if the UE cannot acquire detailed location information. In this event, the UE may delete the Logged Measurement Configuration already set.

(e1) The UE rejects turning off the GNSS receiver 220.

Note that, although no session is established between the UE and the E-SMLC while the UE is in IDLE mode, the location information at the time point when the UE transitions to IDLE mode is guaranteed in accuracy. Hence, it is highly likely that the UE in IDLE mode can acquire accurate location information (detailed location information) in the MDT measurement processing (Logged MDT measurement).

In Step S1109, the UE transitions from IDLE mode to CONNECTED mode. In the case where the reason why the UE has been selected is indicated in Step S1106, the UE may send the network first information (a 1-bit indicator A, for example) indicating that detailed location information is included in measurement data acquired through the MDT measurement processing (Logged MDT measurement), when sending the network information (Availability Indicator) indicating that the UE has the measurement data.

In Step S1110, upon request from the network, the UE transmits (reports) the measurement data acquired through the MDT measurement processing (Logged MDT measurement) to the network. More specifically, the UE transmits a response to the request (UE Information Response) including the measurement data. In the case where the reason why the UE has been selected is indicated in Step S1106, the UE may include first information (a 1-bit indicator A, for example), which indicates that detailed location information is included in the measurement data, in the UE Information Response including the measurement data when transmitting the UE Information Response to the network.

Note that, in the case where the control (b1) is performed after the MDT measurement processing (Logged MDT measurement) is started in Step S1108, the measurement data includes both measurement data with detailed location information and measurement data without detailed location information. In this case, the UE may transmit second information (a 1-bit indicator B, for example) indicating that the measurement data includes both measurement data with detailed location information and measurement data without detailed location information, together with the Availability Indicator or the UE Information Response. Further, the second information (the 1-bit indicator B, for example) may be used with the first information (the 1-bit indicator A, for example).

(1.1.2) Approach 2

Figure 8:
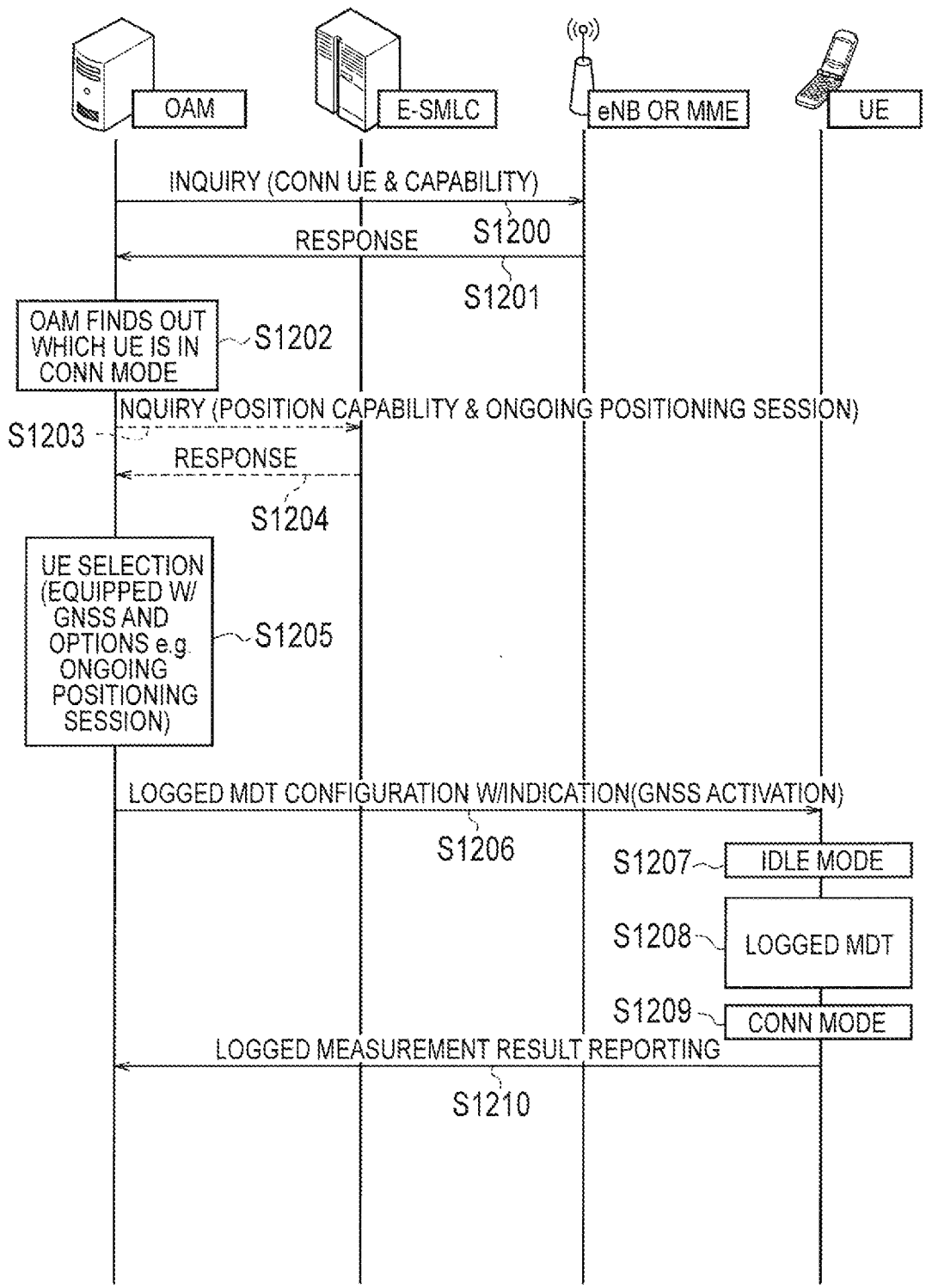
FIG. 8 is an operation sequence diagram in the case of employing Approach 2 in Signaling-based Logged MDT.

FIG. 8 is an operation sequence diagram in the case of employing Approach 2 in Signaling-based Logged MDT.

As shown in FIG. 8, in Step S1200, the OAM inquires of the network node (the eNB or the MME) as to the capability regarding the positioning function of each UE in CONNECTED mode (e.g. whether or not the UE is equipped with the GNSS receiver 220 (whether or not the UE has stand-alone GNSS)).

In Step S1201, the network node (the eNB or the MME) having received the inquiry in Step S1200 notifies the OAM of the capability of each UE in CONNECTED mode in response to the inquiry.

In Step S1202, the OAM finds out which UEs are in CONNECTED mode through the notification received in Step S1200.

In Step S1203, the OAM inquires of the E-SMLC as to the positioning capability of each UE in CONNECTED mode and if an ongoing session exists between the UE and the E-SMLC. Note that, if a different network node knows the positioning capability of the UE and if an ongoing session exists between the UE and the E-SMLC, the OAM may inquire of the different network node.

In Step S1204, the E-SMLC notifies the OAM of the positioning capability of the UE in CONNECTED mode and the ongoing session between the UE and the E-SMLC, in response to the inquiry in Step S1203.

Note that Steps S1203 and S1204 are not essential and that the process may skip Steps S1203 and S1204 and proceed to the subsequent step.

In Step S1205, the OAM selects a UE capable of acquiring detailed location information, in order to use it in MDT. More specifically, the OAM selects a UE equipped with the GNSS receiver 220. The OAM may alternatively select a UE equipped with the GNSS receiver 220 and having an ongoing session with the E-SMLC.

In Step S1206, the OAM sets Logged MDT in the UE via the eNB. More specifically, the OAM transmits Logged MDT setting information (Logged Measurement Configuration) to the UE via the eNB. In the Logged Measurement Configuration, the OAM includes information (a 1-bit indicator, for example) requesting detailed location information, and may include information specifying a positioning method (such as GNSS) for acquiring detailed location information.

Upon receiving the Logged Measurement Configuration, the UE sets a Duration timer to a logging period (measurement period) included in the Logged Measurement Configuration, and initiates the Duration timer. If the GNSS receiver 220 is in OFF state at the time point when the UE receives the Logged Measurement Configuration, the UE also turns on the GNSS receiver 220 in accordance with the information (the 1-bit indicator, for example) requesting the detailed location information.

The UE performs any one of the following control (a2) to (d2) when the user performs manipulation to turn off the GNSS receiver 220 while the UE is in CONNECTED mode after the UE receives the Logged Measurement Configuration including the information (the 1-bit indicator, for example) requesting the detailed location information.

(a2) The UE turns off the GNSS receiver 220. Then, the UE turns on the GNSS receiver 220 automatically (i.e., without notification to the user) when transitioning to IDLE mode.

(b2) The UE turns off the GNSS receiver 220. Then, after transitioning to IDLE mode, the UE carries out MDT measurement processing (Logged MDT measurement) without acquiring detailed location information.

(c2) The UE turns off the GNSS receiver 220. Then, the UE does not carry out MDT measurement processing (Logged MDT measurement) after transitioning to IDLE mode. In this case, the UE may notify the network of the fact that the UE currently stops the MDT measurement processing (Logged MDT measurement), after transitioning from IDLE mode to CONNECTED mode.

(d2) The UE rejects turning off the GNSS receiver 220.

In Step S1207, the UE transitions from CONNECTED mode to IDLE mode.

Here, the UE performs the following control (e2) or (f2) if transitioning back to CONNECTED mode before the Duration timer expires.

(e2) The UE turns off the GNSS receiver 220. Then, when transitioning from CONNECTED mode to IDLE mode, the UE turns on the GNSS receiver 220 automatically unless the Duration timer expires at this point.

The UE keeps the GNSS receiver 220 in ON state unless the Duration timer expires at this point, irrespective of the UE's transition between CONNECTED mode and IDLE mode.

In Step S1208, the UE in IDLE mode carries out MDT measurement processing (Logged MDT measurement) in accordance with the Logged Measurement Configuration.

The UE performs any one of the following control (g2) to (i2) when the user performs manipulation to turn off the GNSS receiver 220.

(g2) The UE turns off the GNSS receiver 220. Then, the UE carries out MDT measurement processing (Logged MDT measurement) without acquiring detailed location information.

(h2) The UE rejects turning off the GNSS receiver 220.

(i2) The UE stops the MDT measurement processing (Logged MDT measurement). In this event, the UE may delete the Logged Measurement Configuration already set.

In Step S1209, the UE transitions from IDLE mode to CONNECTED mode. In the case where it is indicated in Step S1206 that detailed location information is requested, the UE may send the network first information (a 1-bit indicator A, for example) indicating that detailed location information is requested, when sending the network information (Availability Indicator) indicating that the UE has measurement data acquired through the MDT measurement processing (Logged MDT measurement).

In Step S1210, upon request from the network, the UE transmits (reports) the measurement data acquired through the MDT measurement processing (Logged MDT measurement) to the network. More specifically, the UE transmits a response to the request (UE Information Response) including the measurement data. In the case where it is indicated in Step S1206 that detailed location information is requested, the UE may include first information (a 1-bit indicator A, for example), which indicates that detailed location information is requested, in the UE Information Response including the measurement data when transmitting the UE Information Response to the network.

Note that, in the case where the control (b2) or (g2) is performed after the MDT measurement processing (Logged MDT measurement) is started, the measurement data includes both measurement data with detailed location information and measurement data without detailed location information. In this case, the UE may transmit second information (a 1-bit indicator B, for example) indicating that the measurement data includes both measurement data with detailed location information and measurement data without detailed location information, together with the Availability Indicator or the UE Information Response. Further, the second information (the 1-bit indicator B, for example) may be used with the first information (the 1-bit indicator A, for example).

(1.1.3) Mixed Pattern 1 of Approaches 1 and 2

Figure 9:
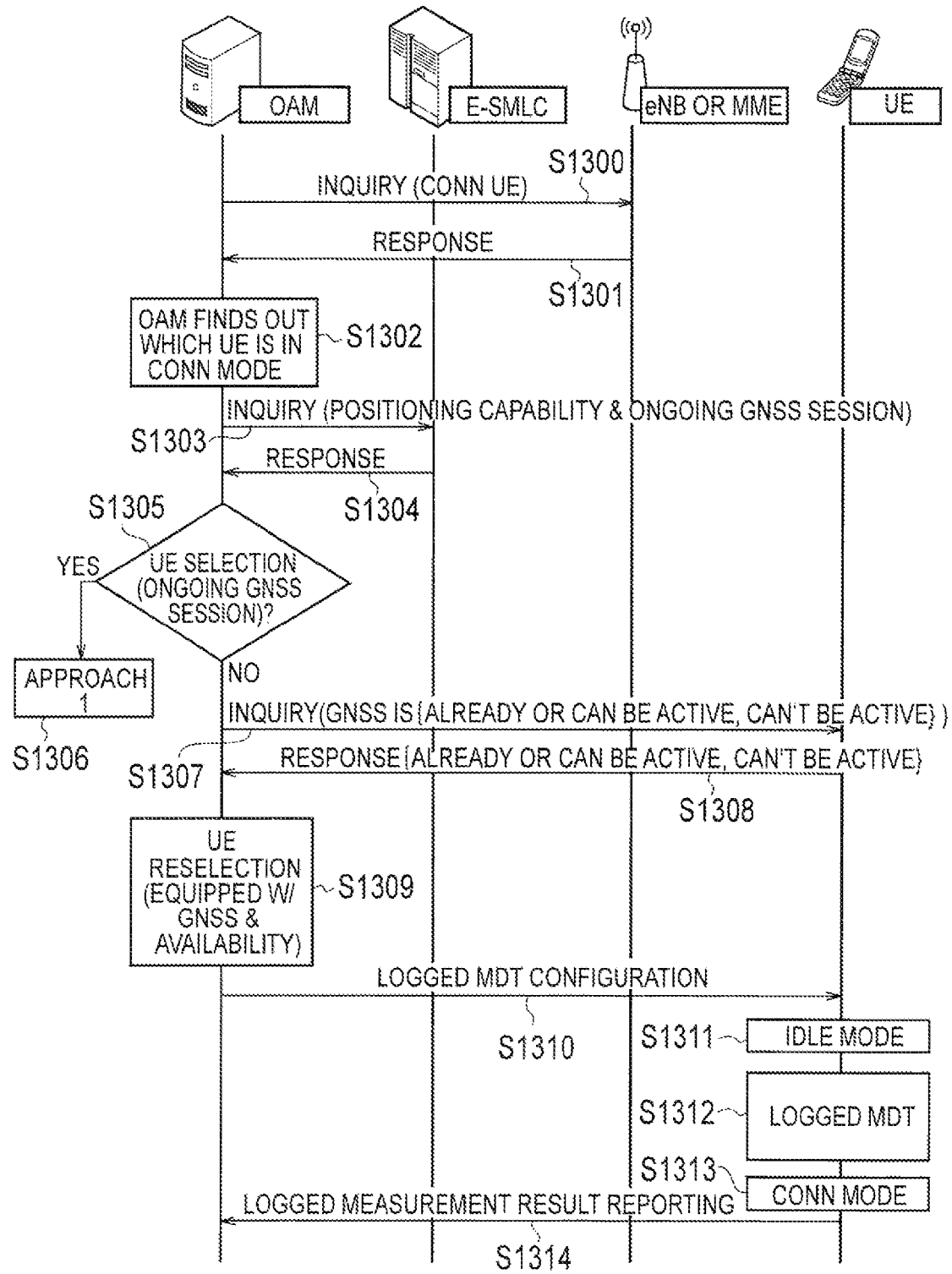
FIG. 9 is an operation sequence diagram in the case of employing Mixed Pattern 1 of Approaches 1 and 2 in Signaling-based Logged MDT.

FIG. 9 is an operation sequence diagram in the case of employing Mixed Pattern 1 of Approaches 1 and 2 in Signaling-based Logged MDT.

As shown in FIG. 9, in Step S1300, the OAM inquires of the network node (the eNB or the MME) which UEs are in CONNECTED mode.

In Step S1301, the network node (the eNB or the MME) having received the inquiry in Step S1300 notifies the OAM of UEs in CONNECTED mode in response to the inquiry.

In Step S1302, the OAM finds out which UEs are in CONNECTED mode through the notification received in Step S1300.

In Step S1303, the OAM inquires of the E-SMLC as to the positioning capability of each UE in CONNECTED mode and if an ongoing session exists between the UE and the E-SMLC. Note that, if a different network node knows the positioning capability of the UE and if an ongoing session exists between the UE and the E-SMLC, the OAM may inquire of the different network node.

In Step S1304, the E-SMLC notifies the OAM of the positioning capability of the UE in CONNECTED mode and the ongoing session between the UE and the E-SMLC, in response to the inquiry in Step S1303.

In Step S1305, the OAM selects a UE capable of acquiring detailed location information based on the notification received in Step S1300, in order to use it in MDT. More specifically, the OAM selects a UE equipped with the GNSS receiver 220 and having an ongoing session with the E-SMLC.

If there is a UE equipped with the GNSS receiver 220 and having an ongoing session with the E-SMLC (Step S1305; YES), the subsequent processes follow Approach 1 described in (1.1.1) (Step S1306).

On the other hand, if there is no UE having an ongoing session with the E-SMLC among UEs equipped with the GNSS receiver 220 (Step S1305; NO), the OAM proceeds the process to Step S1307.

In Step S1307, the OAM inquires of each UE equipped with the GNSS receiver 220 which condition the UE is in among the conditions where the UE has activated the GNSS receiver 220 already, where the UE can activate the GNSS receiver 220, and where the UE cannot activate the GNSS receiver 220.

In Step S1308, in response to the inquiry from the OAM, the UE having received the inquiry notifies the OAM of one of the conditions where the UE has activated the GNSS receiver 220 already, where the UE can activate the GNSS receiver 220, and where the UE cannot activate the GNSS receiver 220.

In Step S1309, the OAM again selects (re-selects) a UE capable of acquiring detailed location information based on the availability of the GNSS receiver 220 notified from the UE in Step S1308, in order to use it in MDT. More specifically, the OAM selects a UE which has activated the GNSS receiver 220 already or a UE which can activate the GNSS receiver 220.

The subsequent processes follow Approach 2 described in (1.1.2). More specifically, the processes in Steps S1310 to S1314 are the same as those in Steps S1206 to S1210 of Approach 2 described in (1.1.2).

(1.1.4) Mixed Pattern 2 of Approaches 1 and 2

Figure 10:
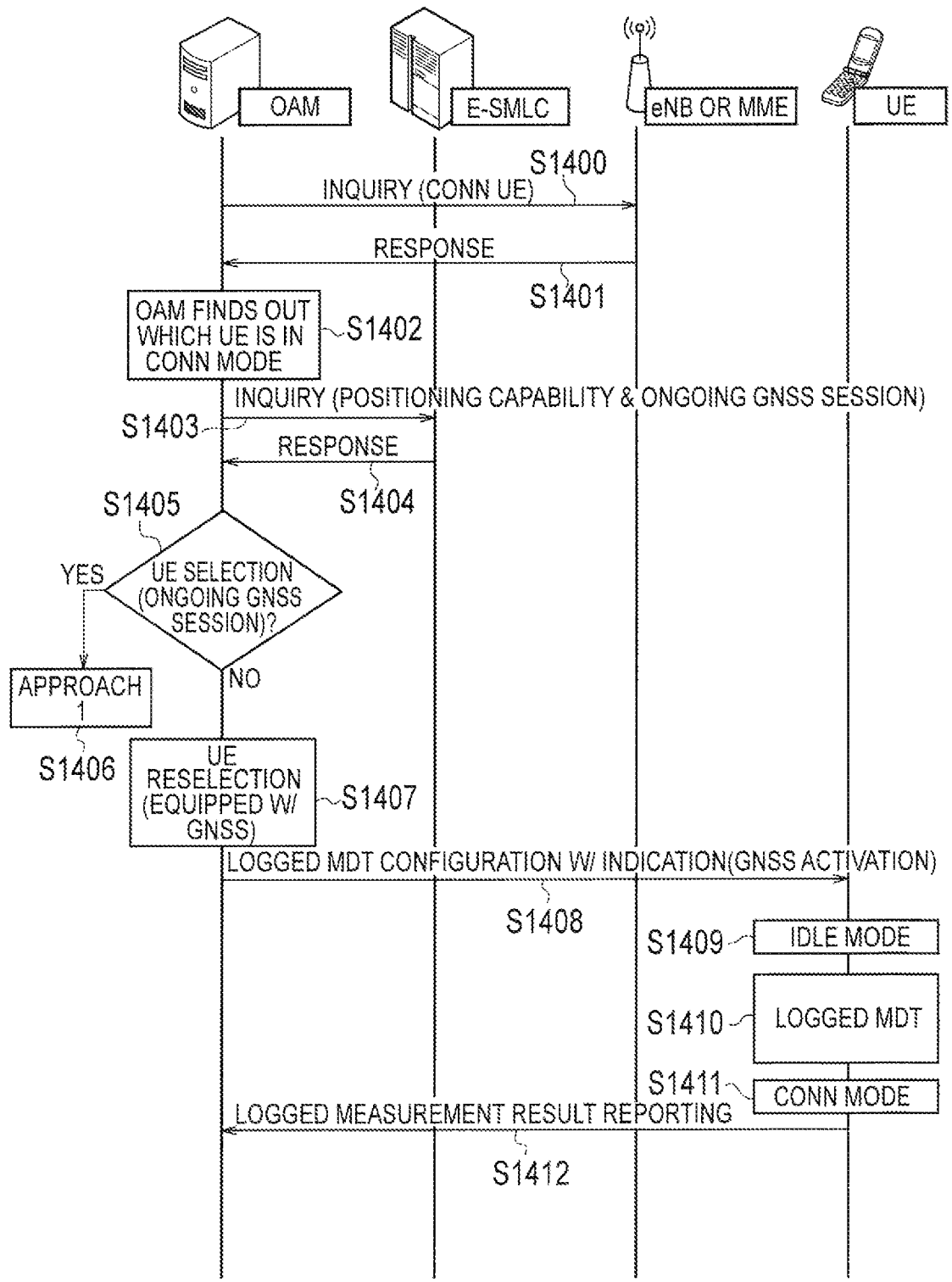
FIG. 10 is an operation sequence diagram in the case of employing Mixed Pattern 2 of Approaches 1 and 2 in Signaling-based Logged MDT.

FIG. 10 is an operation sequence diagram in the case of employing Mixed Pattern 2 of Approaches 1 and 2 in Signaling-based Logged MDT. Mixed Pattern 2 differs from Mixed Pattern 1 above in that an inquiry of each UE as to the availability of the GNSS receiver 220 is not made.

As shown in FIG. 10, the processes in Steps S1400 to S1406 are the same as those in Steps S1300 to S1306 of Mixed Pattern 2 described above.

In Step S1407, the OAM selects a UE equipped with the GNSS receiver 220.

The subsequent processes follow Approach 2 described in (1.1.2). More specifically, the processes in Steps S1408 to S1412 are the same as those in Steps S1206 to S1210 of Approach 2 described in (1.1.2).

(1.2) Immediate MDT

Next, Signaling-based Immediate MDT is described.

It is to be noted that, because the UE carries out MDT measurement processing in CONNECTED mode, the UE can maintain a session with the E-SMLC even during execution of the MDT measurement processing.

(1.2.1) Approach 1

Figure 11:
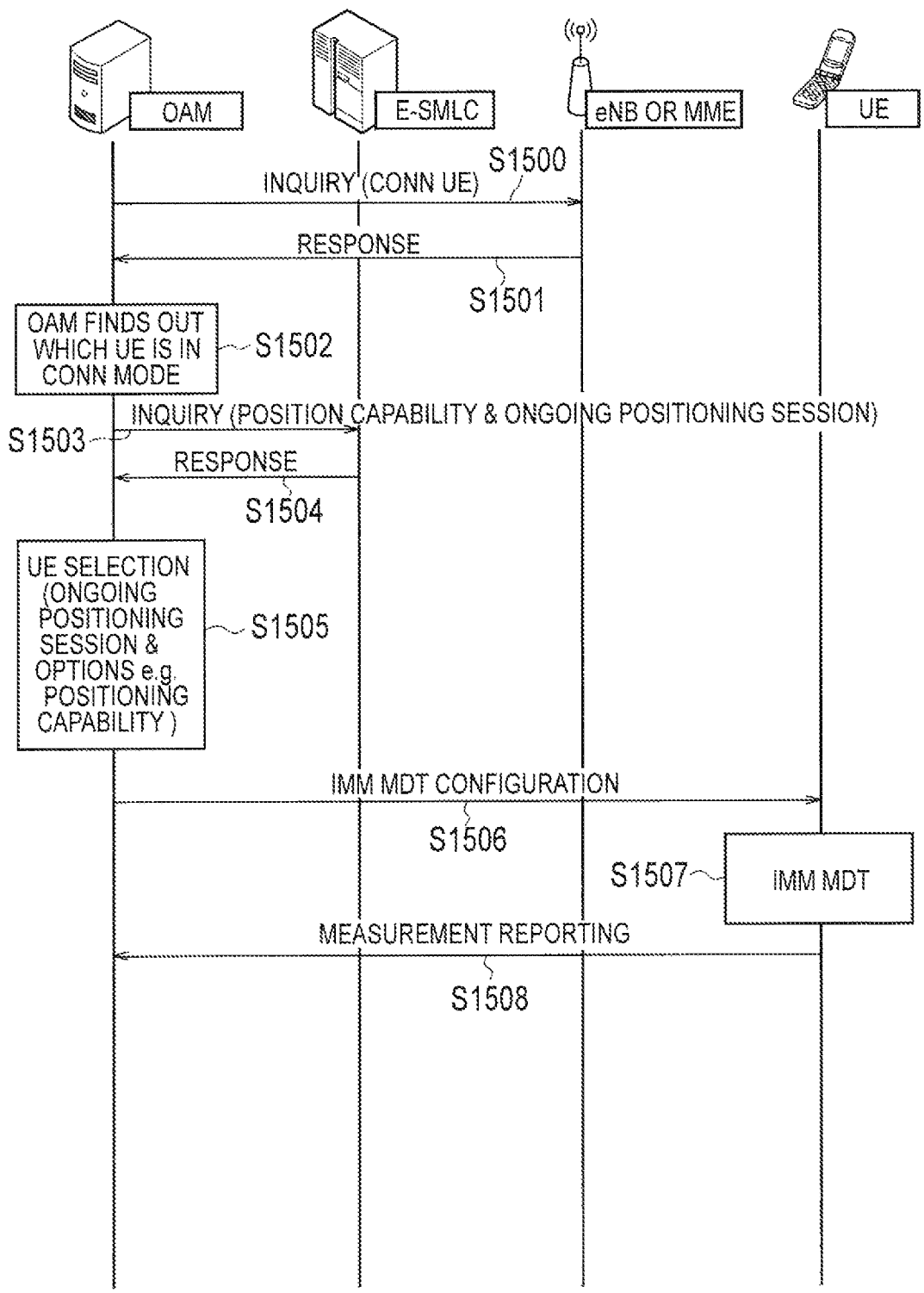
FIG. 11 is an operation sequence diagram in the case of employing Approach 1 in Signaling-based Immediate MDT.

FIG. 11 is an operation sequence diagram in the case of employing Approach 1 in Signaling-based Immediate MDT.

As shown in FIG. 11, in Step S1500, the OAM inquires of the network node (the eNB or the MME) which UEs are in CONNECTED mode.

In Step S1501, the network node (the eNB or the MME) having received the inquiry in Step S1500 notifies the OAM of UEs in CONNECTED mode in response to the inquiry.

In Step S1502, the OAM finds out which UEs are in CONNECTED mode through the notification received in Step S1500.

In Step S1503, the OAM inquires of the E-SMLC as to the positioning capability of each UE in CONNECTED mode and if an ongoing session exists between the UE and the E-SMLC. Note that, if a different network node knows the positioning capability of the UE and if an ongoing session exists between the UE and the E-SMLC, the OAM may inquire of the different network node.

In Step S1504, the E-SMLC notifies the OAM of the positioning capability of the UE in CONNECTED mode and the ongoing session between the UE and the E-SMLC, in response to the inquiry in Step S1503.

In Step S1505, the OAM selects a UE capable of acquiring detailed location information based on the notification received in Step S1500, in order to use it in MDT. For example, the OAM selects a UE having an ongoing session with the E-SMLC.

In Step S1506, the OAM sets Immediate MDT in the UE via the eNB (Configuration). More specifically, the OAM transmits measurement report settings (reportConfig) including information (includeLocationInfo) requesting to transmit a measurement report including location information, as configuration information. The includeLocationInfo is an information element introduced to Release 10. In the Configuration (Immediate Measurement Configuration), the OAM (or the eNB) may include information (a 1-bit indicator, for example) on the reason why the UE has been selected (i.e., the reason that the UE is capable of acquiring detailed location information or the reason that the UE carries out MDT in Release 11 or later), and may also include information specifying a positioning method (such as GNSS) for acquiring detailed location information, as request information.

In Step S1507, the UE carries out MDT measurement processing (Immediate MDT measurement) in accordance with the Immediate Measurement Configuration. The UE must maintain a session with the E-SMLC during the MDT measurement processing (Immediate MDT measurement) except in the case of network assisted GNSS.

The UE performs any one of the following control (a3) to (c3) when the user performs manipulation to turn off the GNSS receiver 220 in the case where the UE carries out the MDT measurement processing (Immediate MDT measurement) while acquiring detailed location information using the GNSS receiver 220. Note that, however, the UE cannot select the control (b3) and (c3) unless the reason why the UE has been selected is indicated in Step S1506.

(a3) The UE turns off the GNSS receiver 220, and keeps acquiring detailed location information by use of another positioning method. If the UE carries out no positioning method other than the GNSS receiver 220 (e.g. if the UE does not support a hybrid positioning method), the UE may execute the MDT measurement processing (Immediate MDT measurement) without acquiring detailed location information, or instead may carry out another positioning method in order to acquire detailed location information.

(b3) If the UE carries out a positioning method other than the GNSS receiver 220 (e.g. if the UE carries out the hybrid positioning method), the UE turns off the GNSS receiver 220.

(c3) The UE rejects turning off the GNSS receiver 220.

In Step S1508, the UE sends the network a measurement report including measurement data acquired through the MDT measurement processing (Immediate MDT measurement).

(1.2.2) Approach 2

Figure 12:
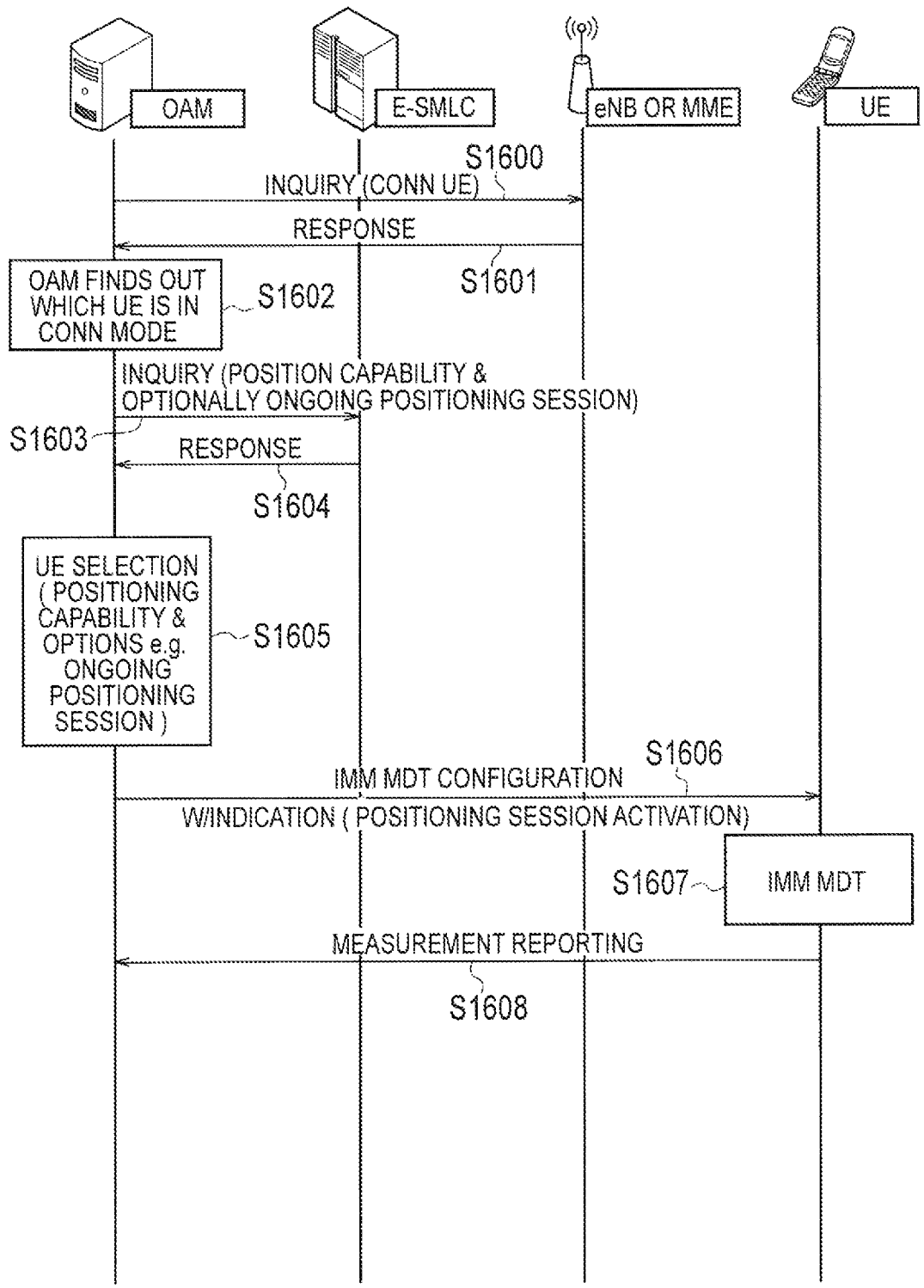
FIG. 12 is an operation sequence diagram in the case of employing Approach 2 in Signaling-based Immediate MDT.

FIG. 12 is an operation sequence diagram in the case of employing Approach 2 in Signaling-based Immediate MDT.

As shown in FIG. 12, the processes in Steps S1600 to S1605 are the same as those in Steps S1500 to S1505 of Approach 1 described in (1.2.1).

In Step S1606, the OAM sets Immediate MDT in the UE via the eNB (Configuration). More specifically, the OAM transmits measurement report settings (reportConfig) including information (includedetailedLocationInfo) requesting to transmit a measurement report including location information, as configuration information. In the Configuration (Immediate Measurement Configuration), the OAM includes information (a 1-bit indicator, for example) requesting detailed location information (or requesting establishment of a session with the E-SMLC), and may also include information specifying a positioning method (such as GNSS or OTDOA) for acquiring detailed location information, as request information.

The processes in Steps S1607 and S1608 are the same as those in Steps S1507 and S1508 of Approach 1 described in (1.2.1).

(1.2.3) Mixed Pattern 1 of Approaches 1 and 2

Figure 13:
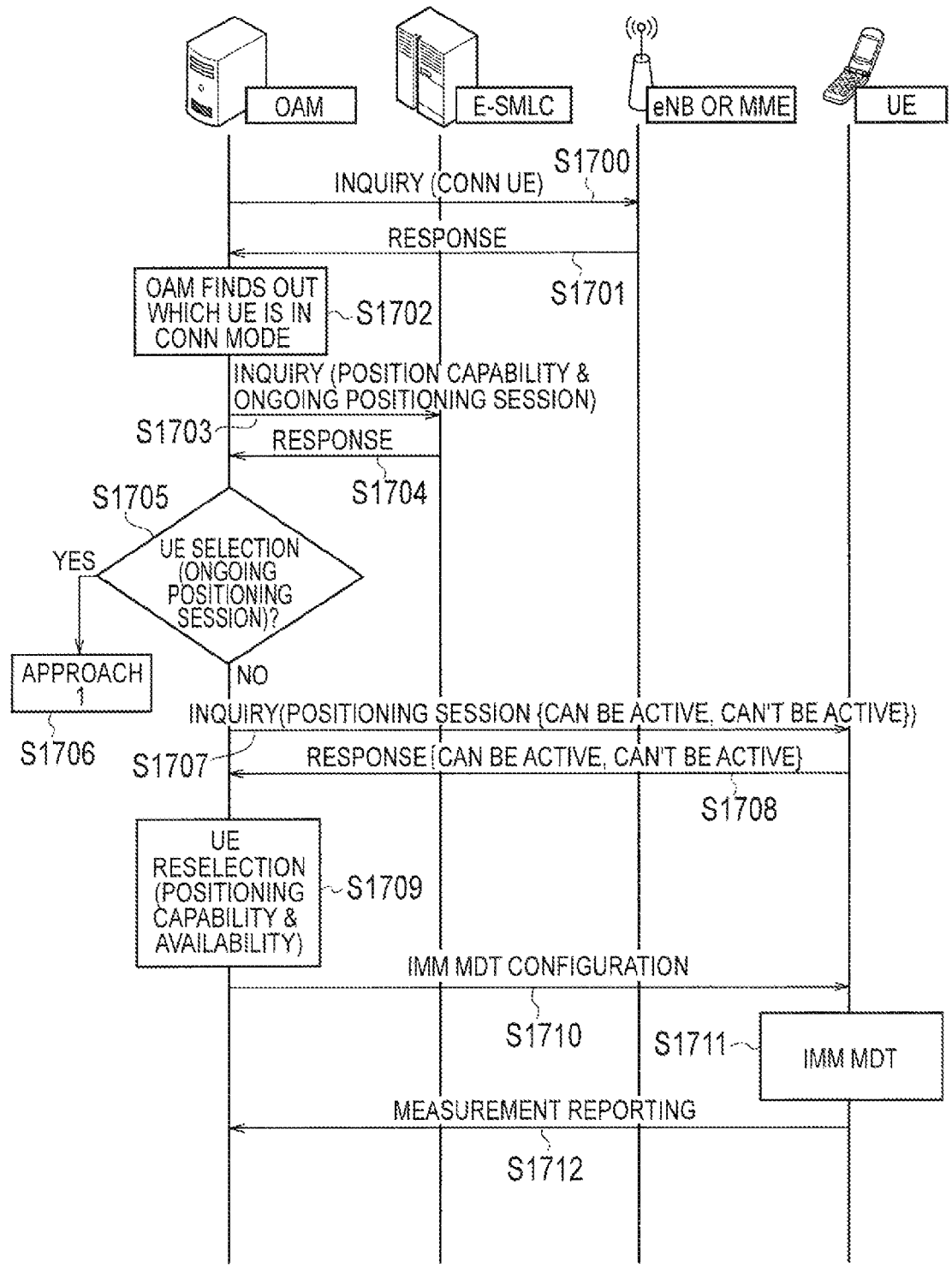
FIG. 13 is an operation sequence diagram in the case of employing Mixed Pattern 1 of Approaches 1 and 2 in Signaling-based Immediate MDT.

FIG. 13 is an operation sequence diagram in the case of employing Mixed Pattern 1 of Approaches 1 and 2 in Signaling-based Immediate MDT.

As shown in FIG. 13, in Step S1700, the OAM inquires of the network node (the eNB or the MME) which UEs are in CONNECTED mode.

In Step S1701, the network node (the eNB or the MME) having received the inquiry in Step S1700 notifies the OAM of UEs in CONNECTED mode in response to the inquiry.

In Step S1702, the OAM finds out which UEs are in CONNECTED mode through the notification received in Step S1700.

In Step S1703, the OAM inquires of the E-SMLC as to the positioning capability of each UE in CONNECTED mode and if an ongoing session exists between the UE and the E-SMLC. Note that, if a different network node knows the positioning capability of the UE and if an ongoing session exists between the UE and the E-SMLC, the OAM may inquire of the different network node.

In Step S1704, the E-SMLC notifies the OAM of the positioning capability of the UE in CONNECTED mode and the ongoing session between the UE and the E-SMLC, in response to the inquiry in Step S1703.

In Step S1705, the OAM selects a UE capable of acquiring detailed location information based on the notification received in Step S1700, in order to use it in MDT. More specifically, the OAM selects a UE having an ongoing session with the E-SMLC.

If there is a UE having positioning capability and having an ongoing session with the E-SMLC (Step S1705; YES), the subsequent processes follow Approach 1 described in (1.2.1) (Step S1706).

On the other hand, if there is no UE having an ongoing session with the E-SMLC among UEs having positioning capability (Step S1705; NO), the OAM proceeds the process to Step S1707.

In Step S1707, the OAM inquires of each UE having positioning capability whether or not the UE can establish a session with the E-SMLC.

In Step S1708, in response to the inquiry from the OAM, the UE having received the inquiry notifies the OAM of whether or not the UE can establish a session with the E-SMLC.

In Step S1709, the OAM again selects (re-selects) a UE capable of acquiring detailed location information based on the availability of a session with the E-SMLC (and the positioning capability of the UE) notified from the UE in Step S1708, in order to use it in MDT. More specifically, the OAM selects a UE capable of establishing a session with the E-SMLC.

The subsequent processes follow Approach 2 described in (1.2.2). More specifically, the processes in Steps S1710 to S1712 are the same as those in Steps S1606 to S1608 of Approach 2 described in (1.2.2).

(1.2.4) Mixed Pattern 2 of Approaches 1 and 2

Figure 14:
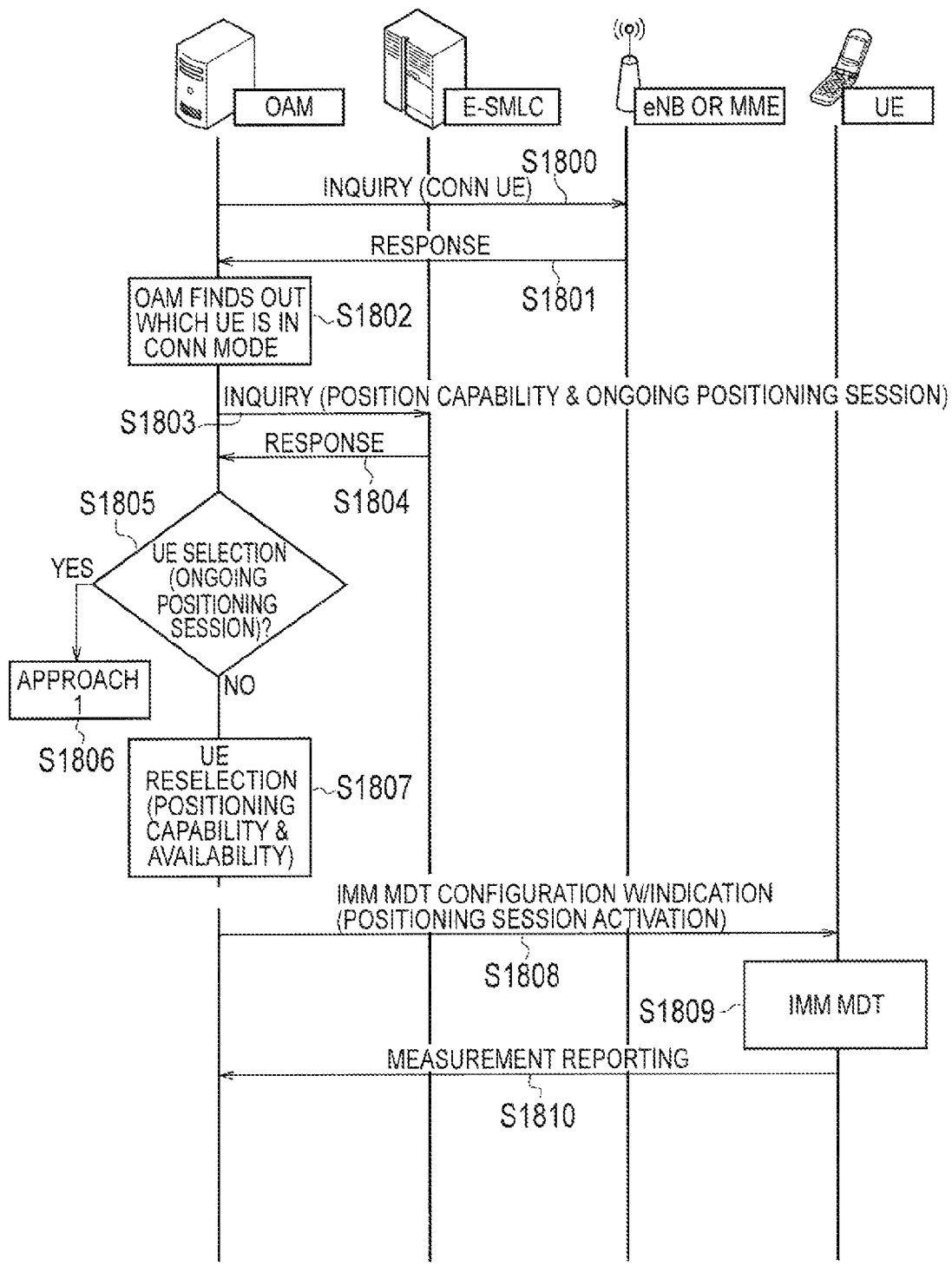
FIG. 14 is an operation sequence diagram in the case of employing Mixed Pattern 2 of Approaches 1 and 2 in Signaling-based Immediate MDT.

FIG. 14 is an operation sequence diagram in the case of employing Mixed Pattern 2 of Approaches 1 and 2 in Signaling-based Immediate MDT. Mixed Pattern 2 differs from Mixed Pattern 1 above in that an inquiry of each UE as to the availability of a session with the E-SMLC is not made.

As shown in FIG. 14, the processes in Steps S1800 to S1806 are the same as those in Steps S1700 to S1706 of Mixed Pattern 2 described above.

In Step S1807, the OAM again selects (re-selects) a UE capable of acquiring detailed location information based on the positioning capability of the UE, in order to use it in MDT. More specifically, the OAM selects a UE having positioning capability.

The subsequent processes follow Approach 2 described in (1.2.2). More specifically, the processes in Steps S1808 to S1810 are the same as those in Steps S1606 to S1608 of Approach 2 described in (1.2.2).

(2) Management-Based Operation (2.1) Logged MDT

Next, Management-based Logged MDT is described.

(2.1.1) Approach 1

Figure 15:
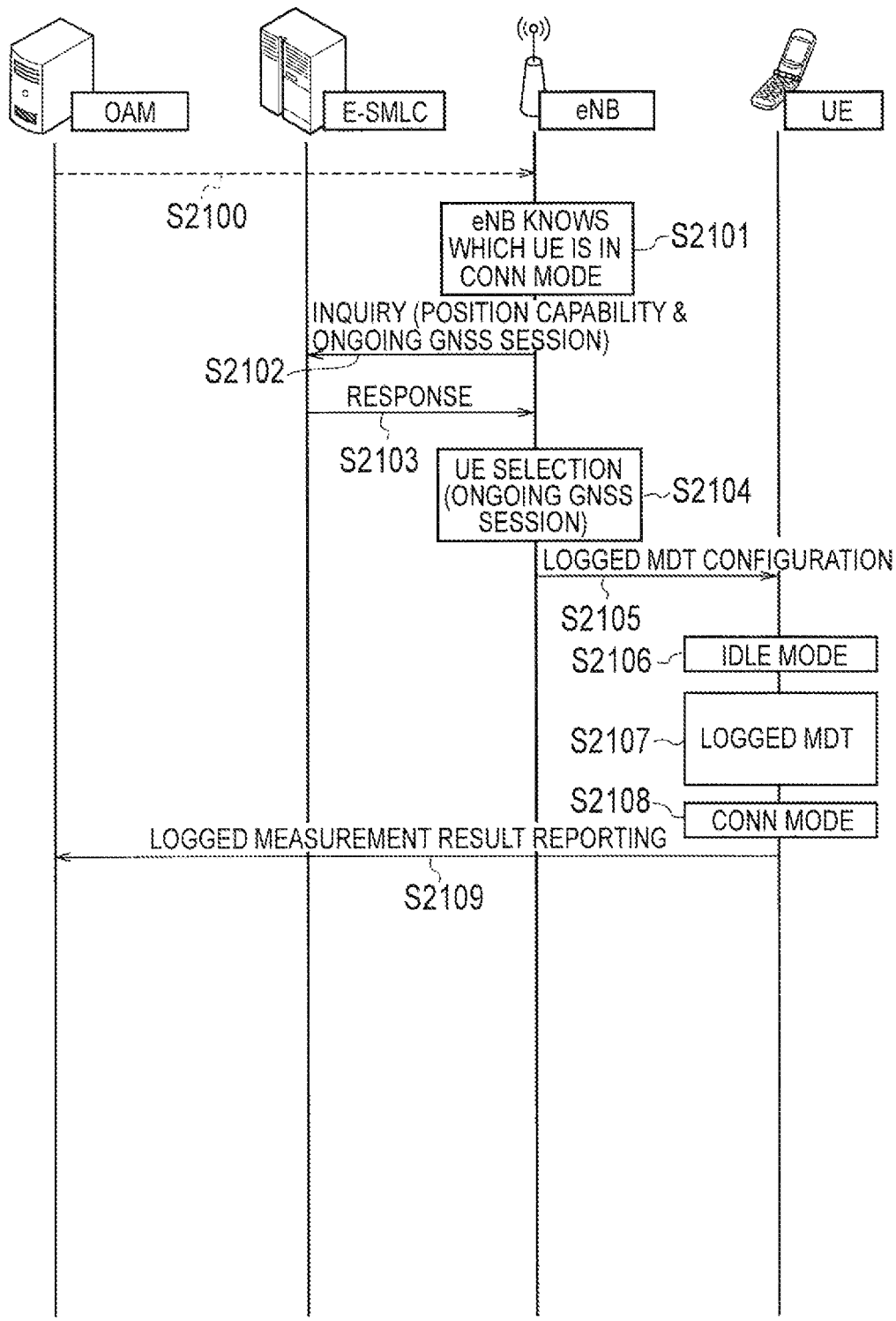
FIG. 15 is an operation sequence diagram in the case of employing Approach 1 in Management-based Logged MDT.

FIG. 15 is an operation sequence diagram in the case of employing Approach 1 in Management-based Logged MDT.

As shown in Steps S2100 to S2109 of FIG. 15, this sequence is the same as the operation sequence described in (1.1.1) except for a point that the processes performed by the OAM in Signaling-based Operation are performed by the eNB.

(2.1.2) Approach 2

Figure 16:
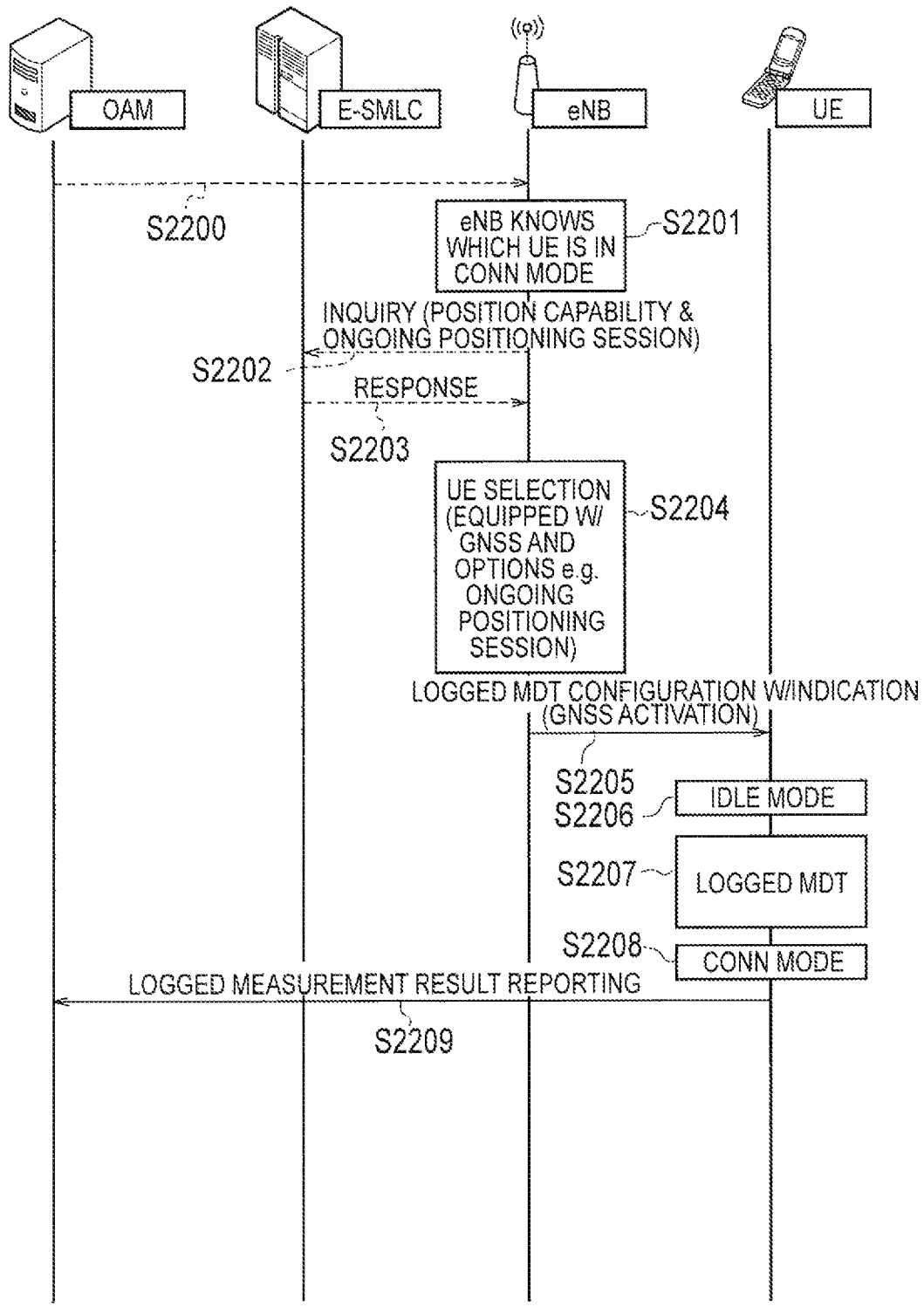
FIG. 16 is an operation sequence diagram in the case of employing Approach 2 in Management-based Logged MDT.

FIG. 16 is an operation sequence diagram in the case of employing Approach 2 in Management-based Logged MDT.

As shown in Steps S2200 to S2209 of FIG. 16, this sequence is the same as the operation sequence described in (1.1.2) except for a point that the processes performed by the OAM in Signaling-based Operation are performed by the eNB.

(2.1.3) Mixed Pattern 1 of Approaches 1 and 2

Figure 17:
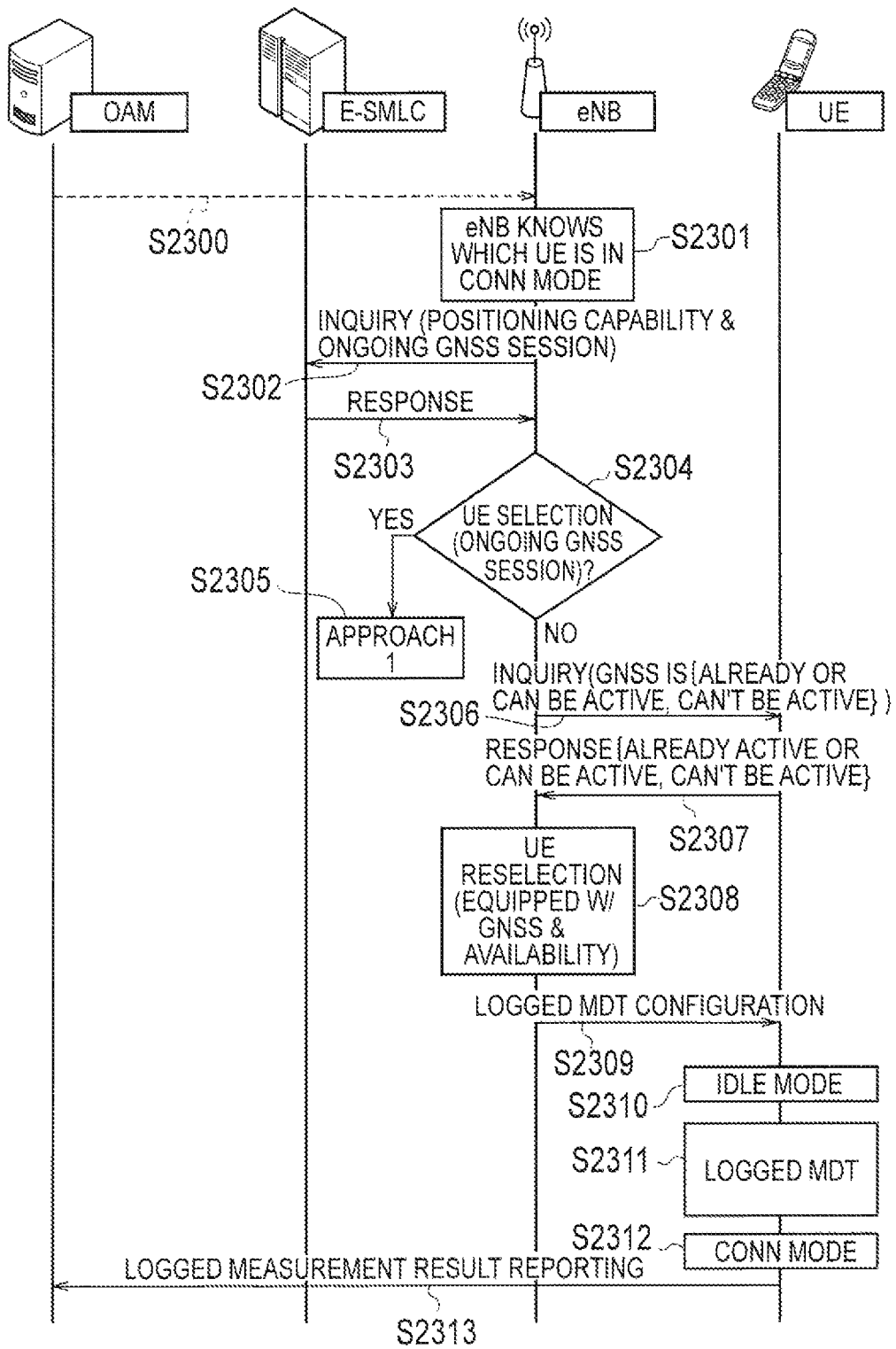
FIG. 17 is an operation sequence diagram in the case of employing Mixed Pattern 1 of Approaches 1 and 2 in Management-based Logged MDT.

FIG. 17 is an operation sequence diagram in the case of employing Mixed Pattern 1 of Approaches 1 and 2 in Management-based Logged MDT.

As shown in Steps S2300 to S2313 of FIG. 17, this sequence is the same as the operation sequence described in (1.1.3) except for a point that the processes performed by the OAM in Signaling-based Operation are performed by the eNB.

(2.1.4) Mixed Pattern 2 of Approaches 1 and 2

Figure 18:
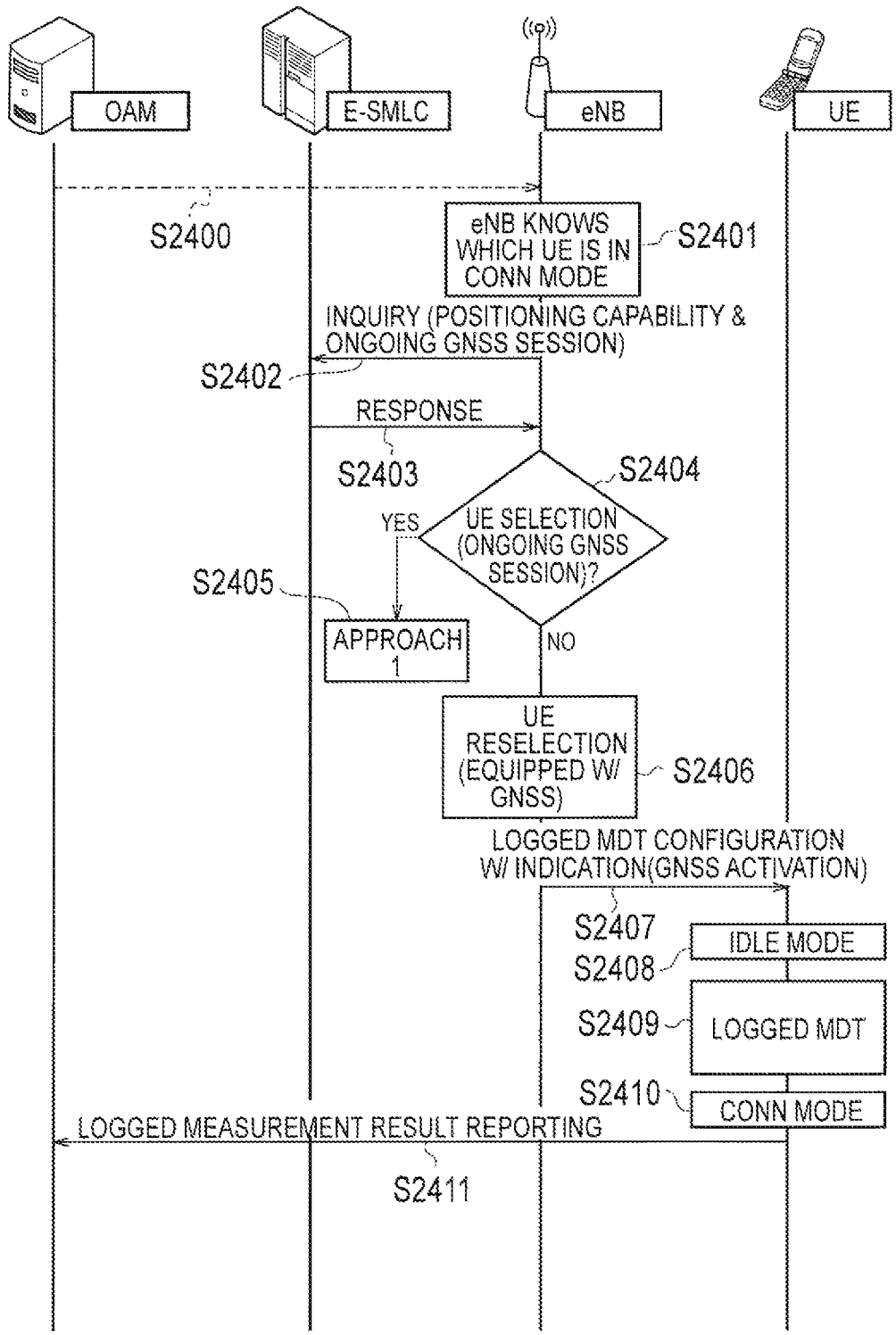
FIG. 18 is an operation sequence diagram in the case of employing Mixed Pattern 2 of Approaches 1 and 2 in Management-based Logged MDT.

FIG. 18 is an operation sequence diagram in the case of employing Mixed Pattern 2 of Approaches 1 and 2 in Management-based Logged MDT.

As shown in Steps S2400 to S2411 of FIG. 18, this sequence is the same as the operation sequence described in (1.1.4) except for a point that the processes performed by the OAM in Signaling-based Operation are performed by the eNB.

(2.2) Immediate MDT

Next, Management-based Immediate MDT is described.

(2.2.1) Approach 1

Figure 19:
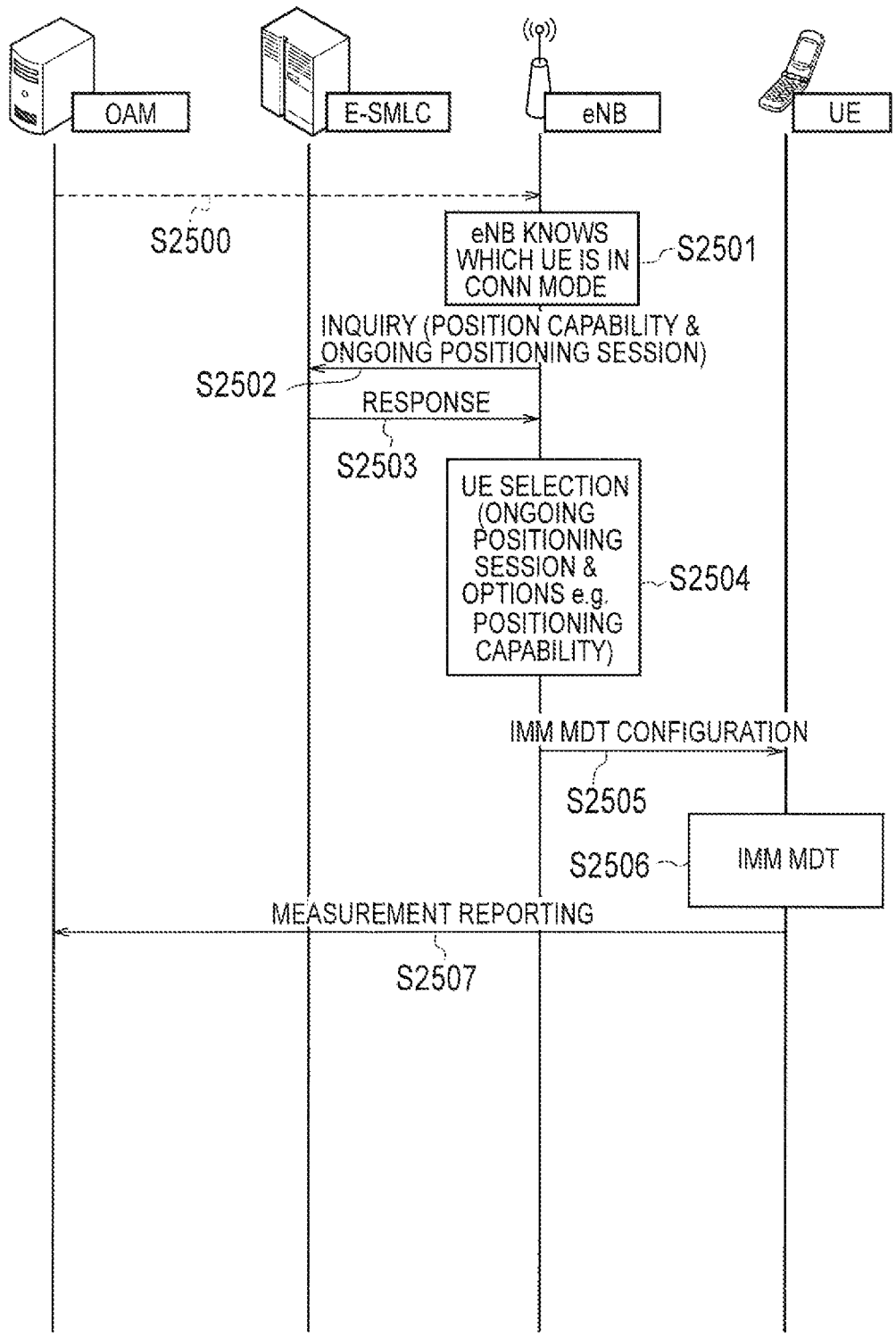
FIG. 19 is an operation sequence diagram in the case of employing Approach 1 in Management-based Immediate MDT.

FIG. 19 is an operation sequence diagram in the case of employing Approach 1 in Management-based Immediate MDT.

As shown in Steps S2500 to S2507 of FIG. 19, this sequence is the same as the operation sequence described in (1.2.1) except for a point that the processes performed by the OAM in Signaling-based Operation are performed by the eNB.

(2.2.2) Approach 2

Figure 20:
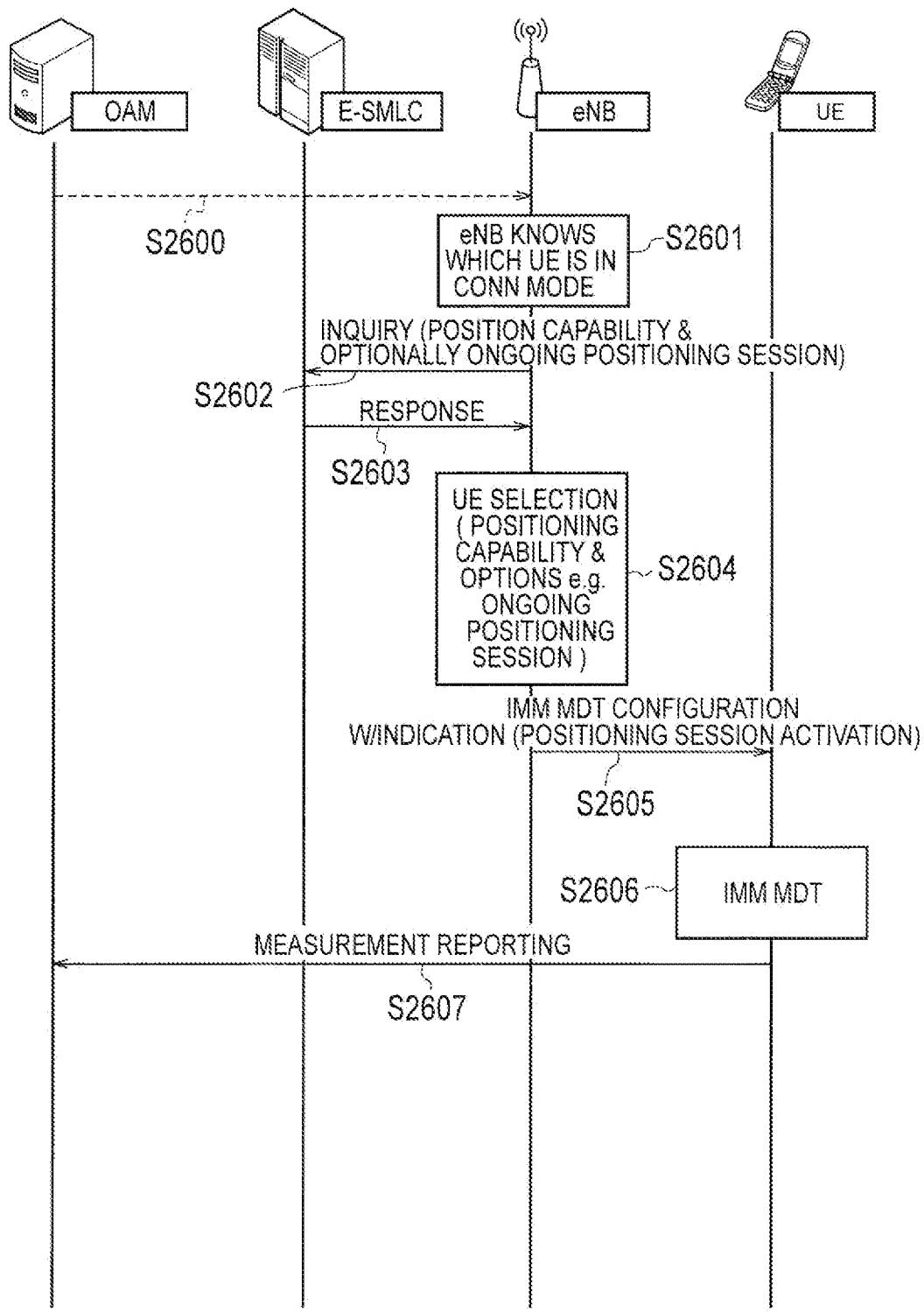
FIG. 20 is an operation sequence diagram in the case of employing Approach 2 in Management-based Immediate MDT.

FIG. 20 is an operation sequence diagram in the case of employing Approach 2 in Management-based Immediate MDT.

As shown in Steps S2600 to S2607 of FIG. 20, this sequence is the same as the operation sequence described in (1.2.2) except for a point that the processes performed by the OAM in Signaling-based Operation are performed by the eNB.

(2.2.3) Mixed Pattern 1 of Approaches 1 and 2

Figure 21:
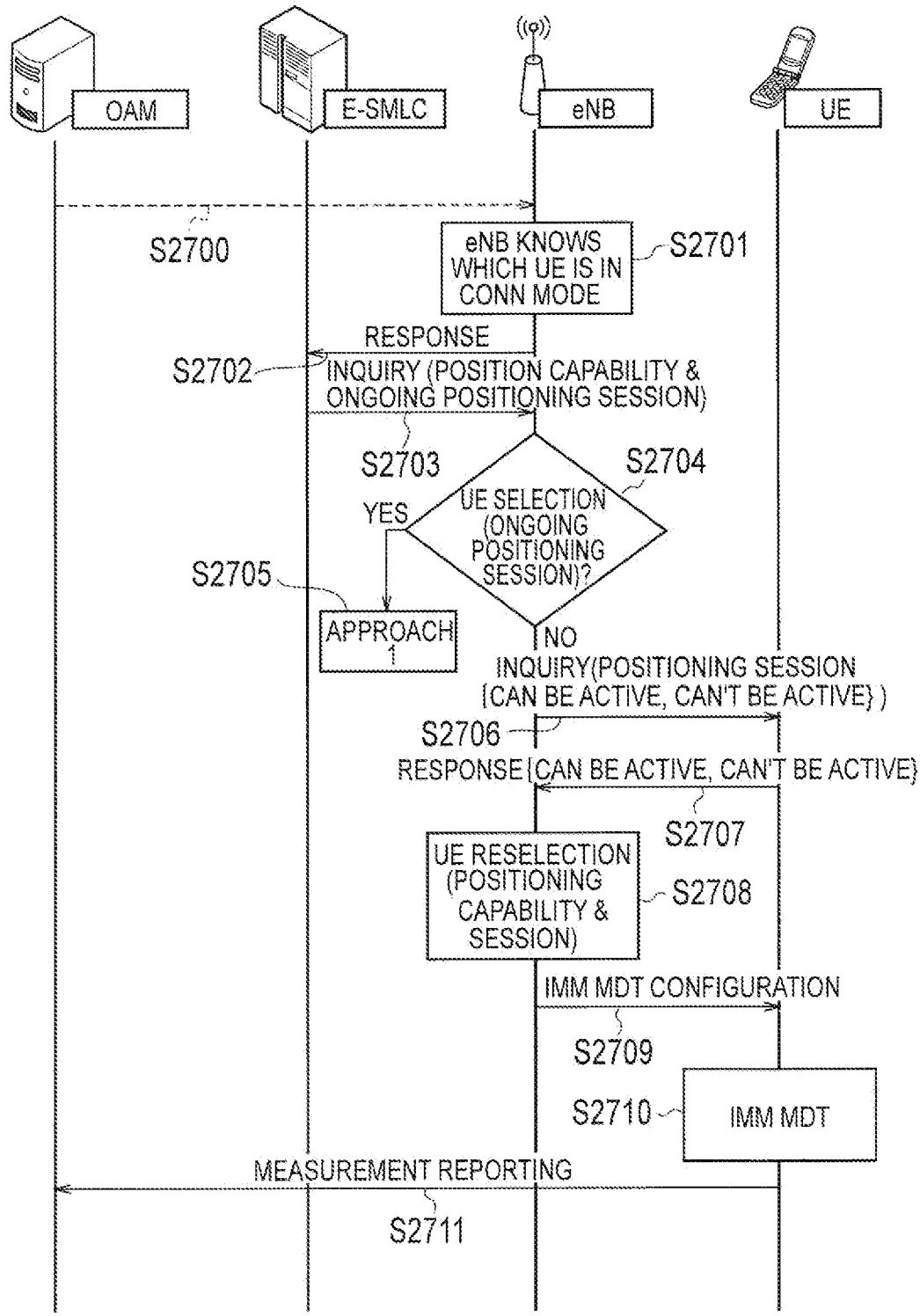
FIG. 21 is an operation sequence diagram in the case of employing Mixed Pattern 1 of Approaches 1 and 2 in Management-based Immediate MDT.

FIG. 21 is an operation sequence diagram in the case of employing Mixed Pattern 1 of Approaches 1 and 2 in Management-based Immediate MDT.

As shown in Steps S2700 to S2711 of FIG. 21, this sequence is the same as the operation sequence described in (1.2.3) except for a point that the processes performed by the OAM in Signaling-based Operation are performed by the eNB.

(2.2.4) Mixed Pattern 2 of Approaches 1 and 2

Figure 22:
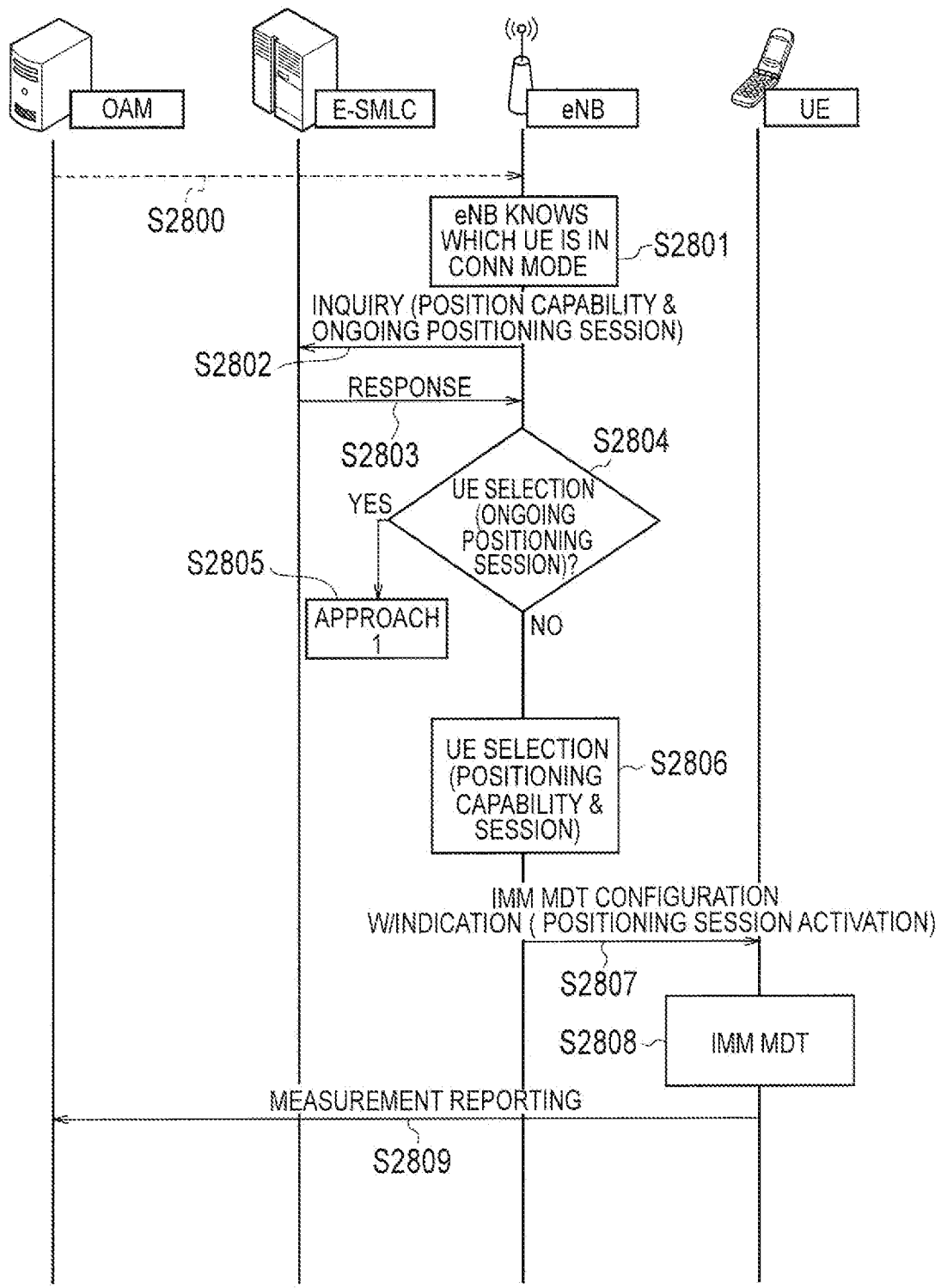
FIG. 22 is an operation sequence diagram in the case of employing Mixed Pattern 2 of Approaches 1 and 2 in Management-based Immediate MDT.

FIG. 22 is an operation sequence diagram in the case of employing Mixed Pattern 2 of Approaches 1 and 2 in Management-based Immediate MDT.

As shown in Steps S2800 to S2809 of FIG. 22, this sequence is the same as the operation sequence described in (1.2.4) except for a point that the processes performed by the OAM in Signaling-based Operation are performed by the eNB.

Conclusion of First Embodiment

As described above, the availability of detailed location information for immediate and logged MDT is enhanced. Moreover, it is possible to avoid MDT measurements that do not have detailed location information available. Especially, for UEs in RRC Connected it should be possible to request additional location information for MDT purpose (i.e., "on-demand" location information for MDT). For logged MDT, this should not require the UE to enter RRC Connected to obtain location information.

Rel-11 MDT will have different feature from Rel-10 MDT especially for location information handling. In Rel-10 MDT, the acquisition of location information is based on best effort. However the detailed location information is required in Rel-11 MDT.

MDT configuration in case detailed location information is requested: In Rel-10 MDT, the MDT measurements are associated with the corresponding positioning fix. However, there is no guarantee that the UE will have detailed location information for all MDT measurement since the positioning information is geared toward applications other than for MDT. Therefore, even if the network were to find out (e.g., through Available Location Solution) that the UE has ongoing positioning the network cannot assume the selected UE for MDT will continue to keep the positioning session active and provide the necessary detailed location information. Therefore, it is particularly important for the network to inform the UE (e.g., during MDT configuration) whether detailed location information is requested if the intention is for the UE to keep the positioning active for MDT. Regardless of UE selection method, if detailed location information is necessary for either Immediate MDT or Logged MDT the UE should be informed explicitly (e.g., during MDT configuration) whether detailed location information is needed even if the UE has an ongoing positioning session (Proposal 1).

UE behavior when detailed location information isn't available: Even if Proposal 1 is agreed and UE keep the positioning active for MDT, if the UE only uses GNSS as a positioning system UE can't get the detailed location information in some situations (e.g., indoor scenario). In these scenarios it would be necessary to configure the UE with proper instructions for both Immediate MDT and Logged MDT. The following three Alternatives can be considered: Alternative 1: UE will continue with MDT measurements without detailed location information. Alternative 2: UE stops MDT measurements. It is FFS whether the UE should retain the existing MDT configuration and measurement results. Alternative 3: UE initiate an alternative positioning system and continue MDT with detailed location information. (This procedure may be only applicable for immediate MDT.) Alternative 4: Leave it up to UE implementation. Alternative 3 creates additional complexity in the UE and it can't be applied for Logged MDT. Although alternative 2 is reasonable for the UE, the behavior is quite a deviation from Rel-10 MDT. Alternative 4 results in different behavior from different UE which isn't desirable for the network. Alternative 1 is simple and consistent with existing MDT requirements. Therefore, Alternative 1 should be adopted as the solution. The UE should continue MDT without detailed location information when detailed location information cannot be obtained successfully (Proposal 2).

In the aforementioned embodiment, the usefulness about available location information and on-demand location information in Immediate MDT and Logged MDT, in UE selection. Moreover, method of minimizing signaling load and reducing unnecessary MDT configuration to UE not having detailed location information is disclosed.

The following two Approaches were addressed for the UE selection method. Approach 1 (solution of available location information): Selecting UE for MDT which has detailed location information available. Approach 2 (solution of on-demand location information): Requesting location information for MDT purpose.

Approach 1:

The proposed Available Location Solutions are below; Available Location Solution 1: The NW initiates MDT for a UE (selects the UE for MDT) when positioning is ongoing for the UE. The positioning status is known in the NW. Available Location Solution 2: The NW initiates MDT for a UE (selects the UE for MDT) when positioning is ongoing for the UE. The positioning status is indicated by the UE to the NW. Available Location Solution 3: MDT measurements are provided when detail location information is available. Available Location Solution 3 is basically the existing solution for Rel-10 so it does not resolve the need to identify when positioning is ongoing at the UE. Therefore, Available Location Solution 3 should not be adopted. In the below, the benefits of Available Location Solutions 1 & 2 are discussed and compared for both Immediate MDT and Logged MDT.

Baseline solution for Rel-11 MDT UE selection method: With Available Solution 1 the NW (E-SMLC or MME) knows about ongoing positioning session; therefore, it is not necessary for the NW to ask the UE for the status of ongoing positioning. Meanwhile if Available Location Solution 2 is adopted UE must inform any ongoing positioning to the eNB/NW, which translates to additional RRC signaling. From the signaling load perspective Solution 1 is better than Solution 2. However, neither the eNB nor the NW can determine the UE's stand-alone GNSS status (i.e., "ongoing" or "not") with Solution 1 alone. Since Stand-alone GNSS is one of the most useful positioning system especially for Logged MDT, eNB and/or Network should allow to request UE to send Feedback with respect to on-going positioning information. In order to avoid MDT measurements that do not have detailed location information available, it would be more straight forward for the NW to figure out if NW-assisted positioning is ongoing without requesting the feedback from the UE, but this would be mainly applicable to Immediate MDT. To support Logged MDT it is crucial to also know if stand-alone GNSS is ongoing. The following two Alternatives can be considered as the Baseline solution for Available Location Information: Alternative 1: A combination of Available Location Solution 1 and Available Location Solution 2 (only used for inquiring the UE's stand-alone GNSS status). Alternative 2: Only Available Location Solution 2. From the signaling load perspective Alternative 1 is preferable, since Alternative 2 assumes the UE will inform all ongoing positioning methods to the eNB/NW. In particular Alternative 1 also assumes the NW will only inquire about the UE's stand-alone GNSS status so RRC signaling is limited. However from NW complexity point of view it may be better to only to support Available Location Solution 2 (since Available Location Solution 1 is deficient in the sense that no stand-alone GNSS information is possible without additional enhancement). Alternative 1 or Alternative 2 should be applied as the baseline solution for Available Location Information Solution (Proposal 1). If Alternative 1 is adopted, it should allow eNB and/or NW to request UE to send Feedback with respect to on-going positioning information during or before MDT UE selection in order for eNB and/or NW to know whether stand-alone GNSS is "on-going" or "not".

Approach 2:

Necessity of On-Demand Location Solution: For UEs in RRC Connected, it should be possible for the NW to request additional location information from the UE for MDT purpose (i.e., "on-demand" location information for MDT). This should be applied also for UEs in IDLE, i.e., logged MDT. If the request for detailed location information is only applicable to Immediate MDT the accuracy of the coverage mapping will be severely degraded, since there may be very few UEs with ongoing positioning and the best effort location reporting from Logged MDT will be practically useless. Therefore, On-demand location solution should also be supported in Logged MDT. If On-demand location solution is adopted for both Immediate MDT and Logged MDT, the operator will be able to determine with better accuracy the number UEs needed for MDT since the operator can now expect detailed location information from all the configured UEs. Without On-Demand Location Information for Logged MDT some UEs would be needlessly configured with MDT. Furthermore, if On-Demand Location Information is not adopted for Logged MDT some UEs (i.e., UEs without detailed location information) will be needlessly configured with MDT and some UEs may also be reselected many times which is not preferable situation for end users. Therefore it should adopt both on-demand location solution as well as Available location Solution (i.e., the Hybrid solution) for both Immediate MDT and Logged MDT. For Logged MDT, it should adopt both on-demand location solution and Available location Solution (i.e., the Hybrid solution) for both Immediate MDT and Logged MDT (Proposal 3).

Necessity of Feedback from UE before On-Demand Location request: On-Demand Location solution does have some potential issues. For example, even if the user agrees to perform MDT there could be a situations whereby new positioning system (e.g., GNSS) shouldn't be turned on due to e.g., low battery condition and/or if the UE cannot see the Satellites for a long period of time (e.g., the UE may be in an indoor environment for a long time). Therefore, on-demand positioning request should not be configured for MDT purpose without feedback from the UE on the activation desirability of its positioning system. If the NW has no feedback from the UE whether the On-Demand positioning request can be fulfilled then some UEs may end up not being able to provide MDT measurements with detailed location information. If proposal 2 is agreed, it should also consider whether the UE, without an ongoing positioning session, will also be allowed to indicate to the NW during the Available Location Information feedback process, whether its positioning system can be activated or not. For both Immediate MDT and Logged MDT, the NW should not configure a UE with on-demand positioning request for MDT purpose without getting feedback from the UE on whether it is suitable for the UE to activate its positioning system (Proposal 4). If proposal 2 is agreed, the UE will also be allowed to send feedback on the suitability of positioning activation along with the feedback of ongoing positioning from the Available Location Information request (mainly applicable for a UE without ongoing positioning session).

Modification of First Embodiment

In the foregoing embodiment, the description has been given of the example where the MDT Configuration includes information specifying a positioning system for acquiring detailed location information. Instead of this method, the following method may be employed. Specifically, the UE has information on the priority of positioning systems to be used, and determines a positioning system based on the priority information and information on an ongoing positioning system unless the network specifies a positioning system. The priority information may be specified by the network in advance, or instead may be held by the UE statically.

In addition, although the foregoing embodiment has not particularly described how the UE operates when the Duration timer expires, the UE may stop the GNSS if location information is not required except for use in MDT and thus the GNSS is no longer necessary to be kept in ON state when the Duration timer expires.

UE selection for Requested Location Information: the motivation to introduce enhanced availability of detailed location information is to avoid MDT measurements that do not have detailed location information available. The eNB may request the UE to perform GNSS measurement in order to obtain detailed location information. However, it should be considered whether it is only applicable to UEs with GNSS already active or whether it also includes UEs that do not have GNSS already turned on. In the former case, the UE will continue to keep GNSS active while the latter case will require that the UE turns on its GNSS receiver. UE selection for eNB requests to make GNSS location information available should be carefully planned. A user may decide to turn off the UE's GNSS receiver when the UE's battery condition is low. In some cases the user is even advised to turn off the GNSS whenever possible to save battery power. There could be cases when the UE's battery level is depleted to the point that calls, including emergency calls, cannot be completed successfully. Therefore, UE requested to make GNSS location information available by the eNB should be restricted to be selected among the positioning system already active in order to provide a good user experience. It should be considered about UE behavior in case UE receive the eNB's request to perform GNSS measurements when its GNSS receiver was previously turned off. In that case, we think UEs without GNSS already active should be allowed to continue Immediate MDT with only E-CID location information. If the UE's MDT measurement response comes back with GNSS location information, eNB will know that the UE already has GNSS turned on. At which point the eNB may request that the UE continues to perform GNSS measurement. If the report from the UE indicates no GNSS location information the eNB will have the option to stop the MDT for this UE or at least not mandate that the UE performs MDT with GNSS measurements. This procedure would probably work only Immediate MDT since the eNB won't get immediate feedback from the UE for the Logged MDT. Mandates for GNSS location information for Logged MDT will be feasible if the eNB is able to determine the UE's GNSS status prior to MDT configuration. If the Availability of location information will not be requested by the eNB or sent by the UE, the UE's GNSS status information will not be readily available to the eNB. Therefore we should not adopt the Requested Location Information for Logged MDT.

Proposal 1: eNB's request for UEs to perform GNSS measurements should be restricted to UEs with GNSS already active.

Proposal 2: We should consider about UE behavior in case the UE receives a request to perform GNSS measurements when its GNSS receiver was previously turned off. UEs without GNSS already active may be allowed to continue with Immediate MDT using only E-CID location information.

Proposal 3: If the eNB requests GNSS location measurements from the UEs, UE with GNSS already active should keep the GNSS active during MDT measurements (e.g., at periodical intervals).

Proposal 4: The Requested Location Information for Logged MDT should not be adopted.

Figure 23:
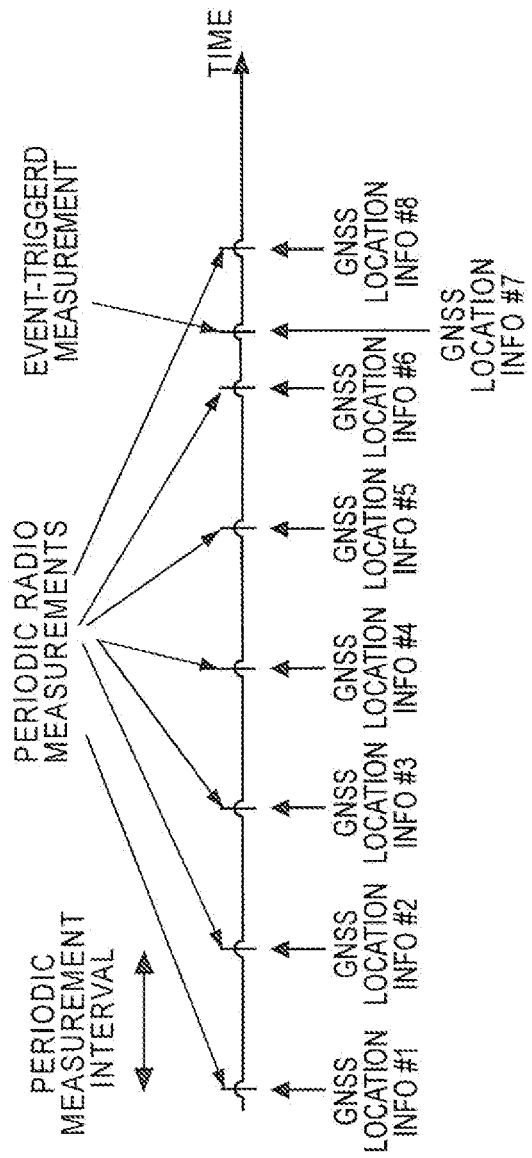
FIG. 23 is a diagram showing the case where location information is based on a GNSS in a periodic MDT measurement.
Figure 24:
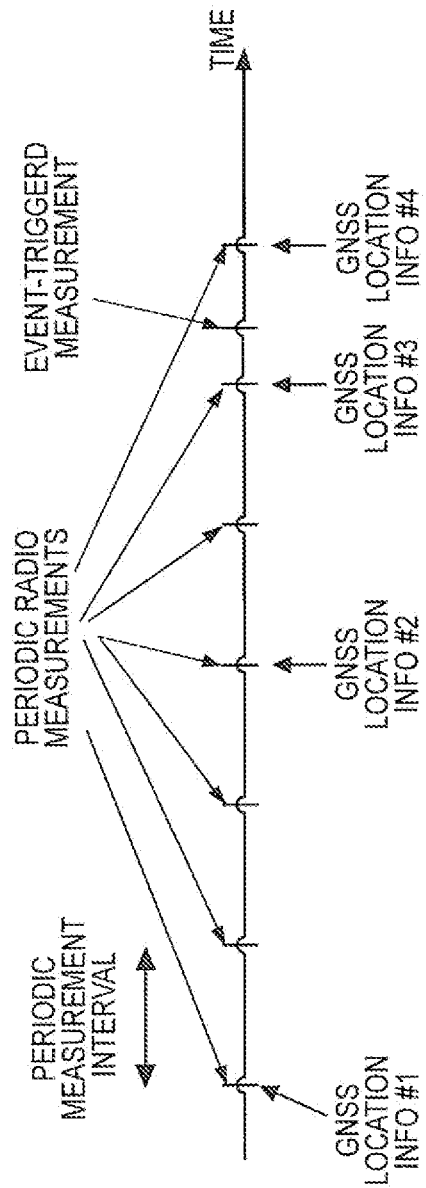
FIG. 24 is a diagram showing the case where GNSS location information is added to some of MDT measurement results.

GNSS Location measurements and reporting: If Proposal 3 is adopted, we should consider whether UE should provide a new GNSS location measurement for each radio measurement. FIG. 23 illustrates the case for location measurement based on GNSS for each MDT periodic measurement (option 1). Option 1's requirement for the UE to include GNSS location information in all measurement results is not feasible esp. for small values of ReportInterval e.g., ms120, ms240, ms480, ms640 due to location information update timing issue. And also in some indoor condition it may be difficult for the UE to obtain GNSS location information. Therefore, if the eNB requests the UE to obtain GNSS location information it should still be up to the UE to determine if and when new GNSS location information is included with the MDT measurements. This option (Option 2) is further depicted in FIG. 24. GNSS location information is only tagged to some of the MDT measurements. It is FFS whether the UE may also autonomously decide if new GNSS location information is needed based on the validity of the latest acquired location information.

Proposal 5: For Requested Location Information, we should adopt option 2 as the basis for Location measurement and reporting.

As described above, eNB configures Immediated MDT to UE. The eNB can configure Requested location measurement (location information acquisition request) to the UE only if the MDT report includes information acquired by means of GNSS (a certain type of feedbacks).

Figure 25:
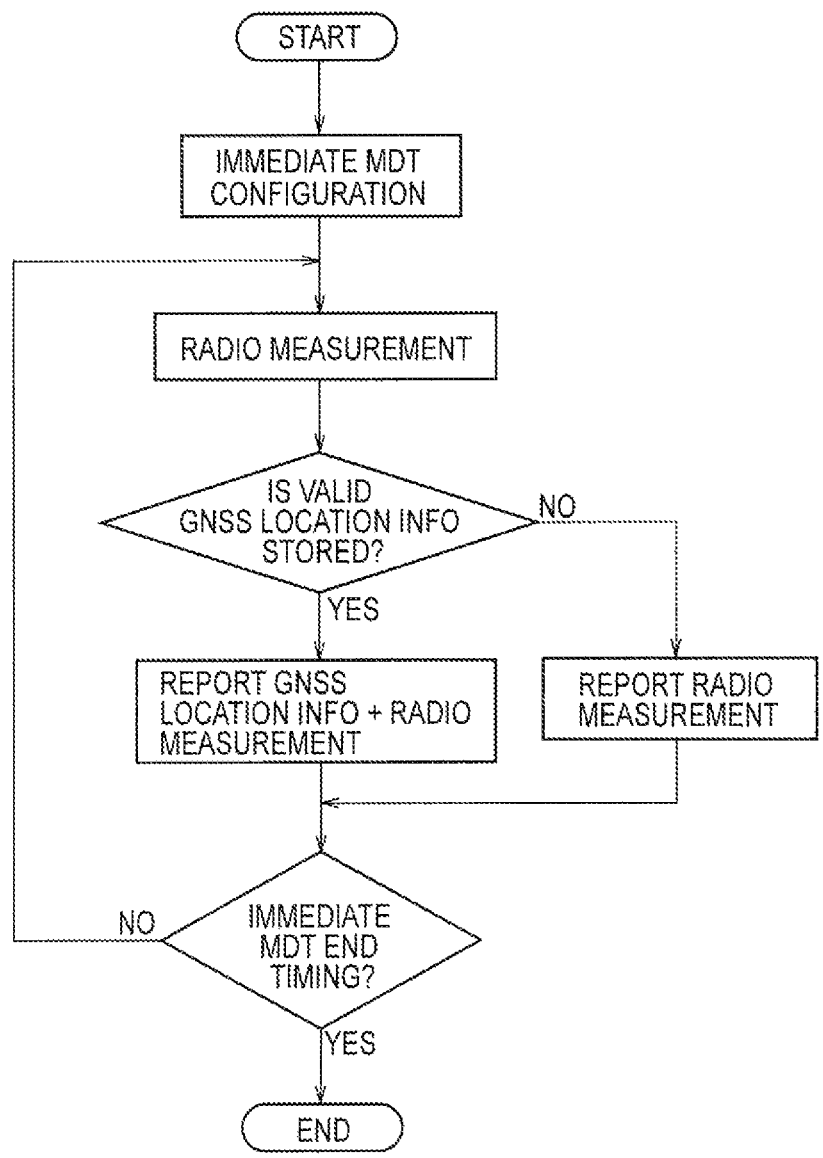
FIG. 25 is a diagram showing the operation of UE in Immediate MDT.

As shown in FIG. 25 (flow chart showing the operation of UE in Immediate MDT), the UE reports measurement results not including GNSS location information when the UE does not have valid GNSS location information, even in a case where Requested location measurement (location information acquisition request using GNSS) is requested to the UE.

Second Embodiment

In the present embodiment, proper UE behaviour when it receives a request from the eNB to make GNSS location information available for Immediate MDT will be explained.

First, the UE keeps the GNSS receiver an active state for the Immediate MDT unless the user turns the GNSS receiver off.

Second, the UE continues the Immediate MDT without the detailed location information (GNSS location information) or acquires the detailed location information by other means when the user turns the GNSS receiver off.

Third, the UE continues to perform GNSS measurements based on capabilities of the GNSS receiver even when the GNSS location information isn't needed except for the Immediate MDT.

The motivation to introduce enhanced availability of detailed location information is to avoid MDT measurements that do not have detailed location information available. From this perspective, UEs requested by eNB to make GNSS location information available should keep the GNSS receiver active for Immediate MDT. Even if the UE has GNSS initially turned off, the UE should have GNSS receiver turned on when it receives the GNSS activation request from the network. However, the user should have the option to turn off the GNSS receiver thereafter and the GNSS receiver should remain off for the remainder of the MDT session unless the user turns it back on. UEs requested by OAM/RNC/eNB to make GNSS location information available should keep the GNSS receiver active for Immediate MDT unless a user decides to turn it off (Proposal 1).

We discuss whether the UE needs to provide a new GNSS location measurement for each radio measurement. As illustrated in FIG. 23, Option 1's requirement for the UE to include GNSS location information in all measurement results is not feasible since not all GNSS receiver implementation will be able to update location information quickly enough, and the location updates may also depend on the number of satellites the GNSS receiver can see at any given time. And also in some indoor condition it may be difficult for the UE to obtain GNSS location information. Therefore, if the OAM/RNC/eNB requests the UE to obtain GNSS location information it should still be up to the UE to determine if and when new GNSS location information is included with the MDT measurements. This option (Option 2) is further depicted in FIG. 24. GNSS location information is only tagged to some of the MDT measurements. In conclusion, we think while the GNSS receiver is active, UEs requested by OAM/RNC/eNB to make GNSS location information available should continue to perform GNSS measurements based on GNSS receiver's capability even in the case detailed location information isn't needed except for Immediate MDT (Proposal 2).

It would also be necessary to decide on the proper UE behaviour in case a user turns off the UE's GNSS receiver after receiving the GNSS activation request. In some cases a user is even advised to turn off the GNSS receiver whenever possible to save battery power. We believe the simplest way is for the UE to continue with Immediate MDT without the detailed location information or with the location information acquired by some other means e.g., E-CID. In case the user decides to turn off the UE's GNSS receiver after receiving the GNSS activation request, the UE should continue with Immediate MDT without the detailed location information or with the location information acquired by some other means (Proposal 3).

The Requested Location Information will be an additional burden for the UE. If the UE frequently receives the OAM/RNC/eNB's request for Requested Location Information and the user notices the UE's GNSS receiver sometimes turns on autonomously and the UE's power consumption is higher than expected due to MDT with GNSS activation request, the user may decide to change his/her user consent. Therefore, other feasible solution to avoid this situation should be found. One alternative is to allow the UE with the temporal denial of the GNSS receiver activation request. There may be special cases when the UE should have the option to autonomously deny the GNSS request e.g., when the UE's battery level is extremely low. This feature may allow the UE to avoid excessive power consumption under low battery condition. It is assumed there are cases when the UE's battery level is depleted to the point when calls, including emergency calls, cannot be completed successfully. However if this feature is adopted, the proper UE behaviour and whether the condition for using this feature is decided autonomously by the UE or configured by the network. Another alternative is to provide a guideline on when the UE may be requested to make GNSS location information available. For example, NW(OAM/RNC/eNB)'s requests for UEs to perform GNSS measurements should be selected based on UEs with GNSS already active. If the UE's MDT measurement response, prior to the NW's request, comes back with GNSS location information, NW will know that the UE already has GNSS turned on. At this point the NW may request that the UE continues to perform GNSS measurement. If the report from the UE indicates no GNSS location information the NW will have the option to stop the MDT for this UE or at least not mandate that the UE performs MDT with GNSS measurements. It may not always be feasible for the NW to determine which UEs have GNSS already turned on, but it should make every attempt to do so before requesting GNSS location information from UEs without GNSS already turned on. From UE's battery consideration, NW's selection of UEs to perform GNSS measurements should be based on UEs with GNSS already active (Proposal 4).

Requested location information in logged MDT: The main disadvantages with Logged MDT are the likelihood of additional power consumption and the lack of knowledge of GNSS receiver status. In other words, requested location information for Logged MDT will only be feasible if the NW is able to determine the UE's GNSS and battery status prior to MDT configuration. The Availability of location information will not be requested by the NW or sent by the UE, the UE's GNSS status information will not be readily available to the NW. However, if guidelines on battery threshold requirements and a mechanism for the network to obtain GNSS status (either requested by the OAM/RNC/eNB or sent by the UE) prior to GNSS requests are introduced, requested location information for Logged MDT may be revisited (Proposal 5).

User consent for requested location information: Standalone GNSS is used as the default baseline. It's assumed that a UE which has its GNSS receiver switched off prior to the request will switch on its GNSS receiver after receiving the request. Since Rel-10 MDT doesn't support this feature the existing MDT user consent would not include the necessary agreement to support this feature. However: requested location information for Immediate MDT may be mandatory for Rel-11's user consent of MDT (Proposal 6). The existing user consent of MDT needs to be updated to include requested location information (Proposal 7).

Since requested location information is only adopted for Immediate MDT it should not be used for any other purpose e.g., RLF report or Logged MDT in IDLE (Proposal 8). Otherwise, the user consent agreement may be violated.

(Additional Statement)

1. UE which receives GNSS activation request is allowed the temporal denial of the request under certain conditions.

2. The temporal denial of the request whereby the UE autonomously deactivates its GNSS receiver.

3. The temporal denial of the GNSS activation request is based on conditions configured by the network.

4. The temporal denial is performed autonomously by the UE and the denial is transparent to the user.

5. One of the conditions whereby the UE's battery level is very low

6. One of the conditions whereby the GNSS signal isn't available for a prolonged period of time.

7. The UE recovers from the certain condition that triggers the temporal denial of the GNSS request. And the UE stops the temporal denial of GNSS request and reactivates its GNSS receiver.

8. The UE in 6 whereby the resumption of GNSS operation is allowed to be performed by the UE autonomously and without further GNSS request from the OAM/RNC/eNB, and is transparent for the user.

9. The UE informs the network of the denial as a result of the UE's temporal denial of the GNSS request.

10. The UE informs the network when the UE stops the temporal denial of the GNSS request and reactivates its GNSS receiver.

11. The network requests GNSS from another UE as a result of receiving the temporal denial from the UE.

Other Embodiments

It should be noted that, although the foregoing embodiment has been described by taking the LTE-based mobile communication system as an example, the present invention is also applicable to other communication standards such as the UMTS (Universal Mobile Telecommunication System).

This application claims the benefit of priorities from U.S. Provisional Application No. 61/679,359 (filed on Aug. 3, 2012), the entire contents of which are incorporated herein by reference.

INDUSTRIAL APPLICABILITY

As described above, the present invention is useful for radio communications such as mobile communication since it is possible to enhance MDT technologies.

The invention claimed is:

1. A user terminal comprising:
   a controller that performs a measurement process of Immediate Minimization of Drive Tests (MDT), wherein the Immediate MDT is such a mode that the user terminal in a connected mode measures a radio environment in accordance with measurement configuration information set by a network and reports as a measurement report a measurement result together with location information to the network;
   a Global Navigation Satellite System (GNSS) receiver for obtaining GNSS location information; and
   a user interface that receives an operation from a user, wherein
   the controller keeps the GNSS receiver in an active state for the Immediate MDT unless the user turns the GNSS receiver off, in a case where the user terminal is requested by the network to make the GNSS location information available,
   after the user terminal is requested by the network to make the GNSS location information available, the controller includes predetermined information in the measurement report to continue the measurement process in a case where the user manually disabled the GNSS receiver, and
   the predetermined information is different from the GNSS location information and is used to determine location of the user terminal.

2. The user terminal according to claim 1, wherein
   while the GNSS receiver is in the active state, the controller continues to perform GNSS measurements based on capabilities of the GNSS receiver even when the GNSS location information is not needed except for the Immediate MDT, in a case where the user terminal is requested by the network to make the GNSS location information available.

3. A processor provided in a user terminal including a controller that performs a measurement process of Immediate Minimization of Drive Tests (MDT), wherein the Immediate MDT is such a mode that the user terminal in a connected mode measures a radio environment in accordance with measurement configuration information set by a network and reports as a measurement report a measurement result together with location information to the network; a Global Navigation Satellite System (GNSS) receiver for obtaining GNSS location information; and a user interface that receives an operation from a user, the processor configured
   to keep the GNSS receiver in an active state for the Immediate MDT unless the user turns the GNSS receiver off, in a case where the user terminal is requested by the network to make the GNSS location information available, after the user terminal is requested by the network to make the GNSS location information available, the controller includes predetermined information in the measurement report to continue the measurement process in a case where the user manually disabled the GNSS receiver, and the predetermined information is different from the GNSS location information and is used to determine location of the user terminal.

4. The processor according to claim 3, wherein while the GNSS receiver is in the active state, the processor continues to perform GNSS measurements based on capabilities of the GNSS receiver even when the GNSS location information is not needed except for the Immediate MDT, in a case where the user terminal is requested by the network to make the GNSS location information available.

5. A method for a user terminal including a controller that performs a measurement process of Immediate Minimization of Drive Tests (MDT), wherein the Immediate MDT is such a mode that the user terminal in a connected mode measures a radio environment in accordance with measurement configuration information set by a network and reports as a measurement report a measurement result together with location information to the network; a Global Navigation Satellite System (GNSS) receiver for obtaining GNSS location information; and a user interface that receives an operation from a user, the method comprising:

keeping the GNSS receiver in an active state for the Immediate MDT unless the user turns the GNSS receiver off, in a case where the user terminal is requested by the network to make the GNSS location information available, after the user terminal is requested by the network to make the GNSS location information available, the controller includes predetermined information in the measurement report to continue the measurement process in a case where the user manually disabled the GNSS receiver, and the predetermined information is different from the GNSS location information and is used to determine location of the user terminal.

6. The method according to claim 5, further comprising:

while the GNSS receiver is in the active state, continuing to perform GNSS measurements based on capabilities of the GNSS receiver even when the GNSS location information is not needed except for the Immediate MDT, in a case where the user terminal is requested by the network to make the GNSS location information available.

* * * * *